(12) United States Patent
Osborne

(10) Patent No.: US 9,843,723 B2
(45) Date of Patent: Dec. 12, 2017

(54) PARALLAX FREE MULTI-CAMERA SYSTEM CAPABLE OF CAPTURING FULL SPHERICAL IMAGES

(71) Applicant: QUALCOMM Incorporated, San Diego, CA (US)

(72) Inventor: Thomas Wesley Osborne, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 150 days.

(21) Appl. No.: 14/743,663

(22) Filed: Jun. 18, 2015

(65) Prior Publication Data

US 2015/0373268 A1 Dec. 24, 2015

Related U.S. Application Data

(60) Provisional application No. 62/015,329, filed on Jun. 20, 2014.

(51) Int. Cl.
*H04N 5/232* (2006.01)
*H04N 5/225* (2006.01)
(Continued)

(52) U.S. Cl.
CPC ..... *H04N 5/23238* (2013.01); *G02B 13/0075* (2013.01); *G02B 13/06* (2013.01);
(Continued)

(58) Field of Classification Search
CPC .... G02B 13/0075; G02B 13/06; G03B 17/17; G03B 37/04; H04N 13/0242;
(Continued)

(56) References Cited

U.S. PATENT DOCUMENTS 3,698,803 A * 10/1972 Watanuki ............... G03B 31/02
352/133
4,114,171 A 9/1978 Altman
(Continued)

FOREIGN PATENT DOCUMENTS

CN 101201459 A 6/2008
CN 101581828 A 11/2009
(Continued)

OTHER PUBLICATIONS

Hao M., et al., "Object Location Technique for Binocular Stereo Vision Based on Scale Invariant Feature Transform Feature Points", SIFT, Journal of Harbin Engineering University, Jun. 2009, vol. 30, No. 6 pp. 649-653.
(Continued)

*Primary Examiner* — Francis G Geroleo

(57) ABSTRACT

Methods and systems for producing spherical field-of-view images. In some examples, an imaging system includes a front camera having a first field-of-view (FOV) in a first direction and an optical axis that extends through the first FOV, a back camera having an optical axis that extends through the first FOV, a plurality of side cameras disposed between the front camera and the back camera, a back light re-directing reflective mirror component disposed between the back camera and plurality of side cameras, the back light re-directing reflective mirror component further disposed perpendicular to the optical axis of the back camera, and a plurality of side light re-directing reflective mirror components, each of the plurality of side cameras positioned to receive light re-directed reflected from one of the plurality of light redirecting reflective mirror components.

29 Claims, 9 Drawing Sheets

(51) Int. Cl.
| | |
|---|---|
| *G02B 13/00* | (2006.01) |
| *G02B 13/06* | (2006.01) |
| *H04N 5/247* | (2006.01) |
| *G03B 17/17* | (2006.01) |
| *G03B 37/04* | (2006.01) |
| *H04N 13/02* | (2006.01) |
| *G03B 35/08* | (2006.01) |

(52) U.S. Cl.
CPC ............. *G03B 17/17* (2013.01); *G03B 35/08* (2013.01); *G03B 37/04* (2013.01); *H04N 5/2254* (2013.01); *H04N 5/2258* (2013.01); *H04N 5/2259* (2013.01); *H04N 5/247* (2013.01); *H04N 13/0242* (2013.01)

(58) Field of Classification Search
CPC .. H04N 5/2254; H04N 5/2258; H04N 5/2259; H04N 5/23238; H04N 5/247
USPC .......................................................... 348/38
See application file for complete search history.

(56) References Cited

U.S. PATENT DOCUMENTS

| | | | |
|---|---|---|---|
| 4,437,745 A | 3/1984 | Hajnal | |
| 4,639,586 A | 1/1987 | Fender et al. | |
| 4,740,780 A | 4/1988 | Brown et al. | |
| 4,751,570 A | 6/1988 | Robinson | |
| 5,012,273 A | 4/1991 | Nakamura et al. | |
| 5,016,109 A | 5/1991 | Gaylord | |
| 5,063,441 A | 11/1991 | Lipton et al. | |
| 5,142,357 A | 8/1992 | Lipton et al. | |
| 5,194,959 A | 3/1993 | Kaneko et al. | |
| 5,207,000 A | 5/1993 | Chang et al. | |
| 5,231,461 A | 7/1993 | Silvergate et al. | |
| 5,243,413 A | 9/1993 | Gitlin et al. | |
| 5,313,542 A | 5/1994 | Castonguay | |
| 5,475,617 A | 12/1995 | Castonguay | |
| 5,506,913 A | 4/1996 | Ibison et al. | |
| 5,539,483 A | 7/1996 | Nalwa | |
| 5,606,627 A | 2/1997 | Kuo | |
| 5,614,941 A | 3/1997 | Hines | |
| 5,640,222 A | 6/1997 | Paul | |
| 5,642,299 A | 6/1997 | Hardin et al. | |
| 5,686,960 A | 11/1997 | Sussman et al. | |
| 5,721,585 A | 2/1998 | Keast et al. | |
| 5,734,507 A | 3/1998 | Harvey | |
| 5,745,305 A | 4/1998 | Nalwa | |
| 5,760,846 A | 6/1998 | Lee | |
| 5,793,527 A | 8/1998 | Nalwa | |
| 5,903,306 A | 5/1999 | Heckendorn et al. | |
| 5,926,411 A | 7/1999 | Russell | |
| 5,990,934 A | 11/1999 | Nalwa | |
| 6,111,702 A | 8/2000 | Nalwa | |
| 6,115,176 A | 9/2000 | Nalwa | |
| 6,128,143 A | 10/2000 | Nalwa | |
| 6,141,034 A | 10/2000 | McCutchen | |
| 6,141,145 A | 10/2000 | Nalwa | |
| 6,144,501 A | 11/2000 | Nalwa | |
| 6,195,204 B1 | 2/2001 | Nalwa | |
| 6,219,090 B1 | 4/2001 | Nalwa | |
| 6,285,365 B1 | 9/2001 | Nalwa | |
| 6,356,397 B1 | 3/2002 | Nalwa | |
| 6,421,185 B1 | 7/2002 | Wick et al. | |
| 6,611,289 B1 | 8/2003 | Yu et al. | |
| 6,628,897 B2 | 9/2003 | Suzuki | |
| 6,650,774 B1 | 11/2003 | Szeliski | |
| 6,700,711 B2 | 3/2004 | Nalwa | |
| 6,701,081 B1 | 3/2004 | Dwyer et al. | |
| 6,768,509 B1 | 7/2004 | Bradski et al. | |
| 6,775,437 B2 | 8/2004 | Kazarinov et al. | |
| 6,782,137 B1 | 8/2004 | Avinash | |
| 6,798,406 B1 | 9/2004 | Jones et al. | |
| 6,809,887 B1 | 10/2004 | Gao et al. | |
| 6,850,279 B1 | 2/2005 | Scherling | |
| 6,855,111 B2 | 2/2005 | Yokoi et al. | |
| 6,861,633 B2 | 3/2005 | Osborn | |
| 6,862,364 B1 | 3/2005 | Berestov | |
| 6,992,700 B1 | 1/2006 | Sato et al. | |
| 7,006,123 B2 | 2/2006 | Yoshikawa et al. | |
| 7,039,292 B1 | 5/2006 | Breiholz | |
| 7,084,904 B2 | 8/2006 | Liu et al. | |
| 7,116,351 B2 | 10/2006 | Yoshikawa | |
| 7,215,479 B1 | 5/2007 | Bakin | |
| 7,253,394 B2 | 8/2007 | Kang | |
| 7,271,803 B2 | 9/2007 | Ejiri et al. | |
| 7,336,299 B2 | 2/2008 | Kostrzewski et al. | |
| 7,612,953 B2 | 11/2009 | Nagai et al. | |
| 7,710,463 B2 | 5/2010 | Foote | |
| 7,805,071 B2 | 9/2010 | Mitani | |
| 7,817,354 B2 | 10/2010 | Wilson et al. | |
| 7,893,957 B2 | 2/2011 | Peters et al. | |
| 7,961,398 B2 | 6/2011 | Tocci | |
| 7,978,222 B2 | 7/2011 | Schneider | |
| 8,004,557 B2 | 8/2011 | Pan | |
| 8,098,276 B2 | 1/2012 | Chang et al. | |
| 8,115,813 B2 | 2/2012 | Tang | |
| 8,139,125 B2 | 3/2012 | Scherling | |
| 8,228,417 B1 | 7/2012 | Georgiev et al. | |
| 8,267,601 B2 | 9/2012 | Campbell et al. | |
| 8,284,263 B2 | 10/2012 | Oohara et al. | |
| 8,294,073 B1 | 10/2012 | Vance et al. | |
| 8,356,035 B1 | 1/2013 | Baluja et al. | |
| 8,400,555 B1 | 3/2013 | Georgiev et al. | |
| 8,442,392 B2 | 5/2013 | Ollila et al. | |
| 8,482,813 B2 | 7/2013 | Kawano et al. | |
| 8,791,984 B2 | 7/2014 | Jones et al. | |
| 8,836,693 B2 | 9/2014 | Katano | |
| 8,928,988 B1 | 1/2015 | Ford et al. | |
| 8,988,564 B2 | 3/2015 | Webster et al. | |
| 9,049,375 B2 | 6/2015 | Wade et al. | |
| 9,055,208 B2 | 6/2015 | Kim | |
| 9,185,296 B2 | 11/2015 | Wade et al. | |
| 9,264,610 B2 | 2/2016 | Duparre | |
| 9,316,810 B2 | 4/2016 | Mercado | |
| 9,332,188 B2 | 5/2016 | Takei et al. | |
| 9,609,210 B2 | 3/2017 | Djordjevic et al. | |
| 2001/0028482 A1 | 10/2001 | Nishioka | |
| 2002/0070365 A1 | 6/2002 | Karellas | |
| 2002/0136150 A1 | 9/2002 | Mihara et al. | |
| 2003/0024987 A1 | 2/2003 | Zhu | |
| 2003/0034395 A1 | 2/2003 | Tsikos et al. | |
| 2003/0038814 A1 | 2/2003 | Blume | |
| 2003/0214575 A1 | 11/2003 | Yoshikawa | |
| 2004/0021767 A1 | 2/2004 | Endo et al. | |
| 2004/0051805 A1* | 3/2004 | Yoshikawa | H04N 5/2254 348/335 |
| 2004/0066449 A1 | 4/2004 | Givon | |
| 2004/0105025 A1 | 6/2004 | Scherling | |
| 2004/0183907 A1 | 9/2004 | Hovanky et al. | |
| 2004/0195492 A1 | 10/2004 | Hsin | |
| 2004/0246333 A1 | 12/2004 | Steuart et al. | |
| 2004/0263611 A1 | 12/2004 | Cutler | |
| 2005/0053274 A1 | 3/2005 | Mayer et al. | |
| 2005/0057659 A1 | 3/2005 | Hasegawa | |
| 2005/0081629 A1 | 4/2005 | Hoshal | |
| 2005/0111106 A1 | 5/2005 | Matsumoto et al. | |
| 2005/0185711 A1 | 8/2005 | Pfister et al. | |
| 2005/0218297 A1 | 10/2005 | Suda et al. | |
| 2006/0023074 A1 | 2/2006 | Cutler | |
| 2006/0023106 A1 | 2/2006 | Yee et al. | |
| 2006/0023278 A1 | 2/2006 | Nishioka | |
| 2006/0061660 A1 | 3/2006 | Brackmann | |
| 2006/0098267 A1 | 5/2006 | Togawa | |
| 2006/0140446 A1 | 6/2006 | Luo et al. | |
| 2006/0193509 A1 | 8/2006 | Criminisi et al. | |
| 2006/0215054 A1 | 9/2006 | Liang et al. | |
| 2006/0215903 A1 | 9/2006 | Nishiyama | |
| 2006/0238441 A1 | 10/2006 | Benjamin et al. | |
| 2007/0024739 A1 | 2/2007 | Konno | |
| 2007/0058961 A1 | 3/2007 | Kobayashi et al. | |
| 2007/0064142 A1 | 3/2007 | Misawa et al. | |
| 2007/0085903 A1 | 4/2007 | Zhang | |
| 2007/0146530 A1 | 6/2007 | Nose | |

(56) References Cited

U.S. PATENT DOCUMENTS

| | | |
|---|---|---|
| 2007/0164202 A1 | 7/2007 | Wurz et al. |
| 2007/0216796 A1 | 9/2007 | Lenel et al. |
| 2007/0242152 A1 | 10/2007 | Chen |
| 2007/0263115 A1 | 11/2007 | Horidan et al. |
| 2007/0268983 A1 | 11/2007 | Elam |
| 2008/0029708 A1 | 2/2008 | Olsen et al. |
| 2008/0030597 A1 | 2/2008 | Olsen et al. |
| 2008/0058629 A1 | 3/2008 | Seibel et al. |
| 2008/0088702 A1 | 4/2008 | Linsenmaier et al. |
| 2008/0117289 A1 | 5/2008 | Schowengerdt et al. |
| 2008/0117532 A1 | 5/2008 | Shafer |
| 2008/0218612 A1 | 9/2008 | Border et al. |
| 2008/0259172 A1 | 10/2008 | Tamaru |
| 2008/0266404 A1 | 10/2008 | Sato |
| 2008/0290435 A1 | 11/2008 | Oliver et al. |
| 2008/0291543 A1 | 11/2008 | Nomura et al. |
| 2008/0297612 A1 | 12/2008 | Yoshikawa |
| 2008/0316301 A1 | 12/2008 | Givon |
| 2009/0003646 A1 | 1/2009 | Au et al. |
| 2009/0005112 A1 | 1/2009 | Sorek et al. |
| 2009/0015812 A1 | 1/2009 | Schultz et al. |
| 2009/0051804 A1 | 2/2009 | Nomura et al. |
| 2009/0080695 A1 | 3/2009 | Yang |
| 2009/0085846 A1 | 4/2009 | Cho et al. |
| 2009/0096994 A1 | 4/2009 | Smits |
| 2009/0153726 A1 | 6/2009 | Lim |
| 2009/0160931 A1 | 6/2009 | Pockett et al. |
| 2009/0268983 A1 | 10/2009 | Stone et al. |
| 2009/0268985 A1 | 10/2009 | Wong et al. |
| 2009/0296984 A1 | 12/2009 | Nijim et al. |
| 2009/0315808 A1 | 12/2009 | Ishii |
| 2010/0044555 A1 | 2/2010 | Ohara et al. |
| 2010/0045774 A1 | 2/2010 | Len et al. |
| 2010/0066812 A1 | 3/2010 | Kajihara et al. |
| 2010/0165155 A1 | 7/2010 | Chang |
| 2010/0202766 A1 | 8/2010 | Takizawa et al. |
| 2010/0215249 A1 | 8/2010 | Heitz et al. |
| 2010/0232681 A1 | 9/2010 | Fujieda et al. |
| 2010/0259655 A1 | 10/2010 | Takayama |
| 2010/0265363 A1 | 10/2010 | Kim |
| 2010/0278423 A1 | 11/2010 | Yuji et al. |
| 2010/0289878 A1 | 11/2010 | Sato et al. |
| 2010/0290703 A1 | 11/2010 | Sim et al. |
| 2010/0290769 A1 | 11/2010 | Nasiri et al. |
| 2010/0302396 A1 | 12/2010 | Golub et al. |
| 2010/0309286 A1 | 12/2010 | Chen et al. |
| 2010/0309333 A1 | 12/2010 | Smith et al. |
| 2011/0001789 A1 | 1/2011 | Wilson et al. |
| 2011/0007135 A1 | 1/2011 | Okada et al. |
| 2011/0009163 A1 | 1/2011 | Fletcher et al. |
| 2011/0012998 A1 | 1/2011 | Pan |
| 2011/0043623 A1 | 2/2011 | Fukuta et al. |
| 2011/0090575 A1 | 4/2011 | Mori |
| 2011/0096089 A1 | 4/2011 | Shenhav et al. |
| 2011/0096988 A1 | 4/2011 | Suen et al. |
| 2011/0128412 A1 | 6/2011 | Milnes et al. |
| 2011/0181588 A1 | 7/2011 | Barenbrug et al. |
| 2011/0213664 A1 | 9/2011 | Osterhout et al. |
| 2011/0235899 A1 | 9/2011 | Tanaka |
| 2011/0249341 A1 | 10/2011 | DiFrancesco et al. |
| 2011/0262122 A1 | 10/2011 | Minamisawa et al. |
| 2011/0304764 A1 | 12/2011 | Shigemitsu et al. |
| 2012/0008148 A1 | 1/2012 | Pryce et al. |
| 2012/0033051 A1 | 2/2012 | Atanassov et al. |
| 2012/0044368 A1 | 2/2012 | Lin et al. |
| 2012/0056987 A1 | 3/2012 | Fedoroff |
| 2012/0075168 A1 | 3/2012 | Osterhout et al. |
| 2012/0229688 A1 | 9/2012 | Tajiri |
| 2012/0249750 A1 | 10/2012 | Izzat et al. |
| 2012/0249815 A1 | 10/2012 | Bohn et al. |
| 2012/0269400 A1 | 10/2012 | Heyward |
| 2012/0281072 A1 | 11/2012 | Georgiev et al. |
| 2012/0293607 A1 | 11/2012 | Bhogal et al. |
| 2012/0293632 A1 | 11/2012 | Yukich |
| 2012/0327195 A1 | 12/2012 | Cheng |
| 2013/0003140 A1 | 1/2013 | Keniston et al. |
| 2013/0010084 A1 | 1/2013 | Hatano |
| 2013/0038689 A1 | 2/2013 | McDowall |
| 2013/0070055 A1 | 3/2013 | Atanassov et al. |
| 2013/0076924 A1 | 3/2013 | Wade et al. |
| 2013/0077945 A1 | 3/2013 | Liu et al. |
| 2013/0128030 A1 | 5/2013 | Georgiev |
| 2013/0141802 A1 | 6/2013 | Yang |
| 2013/0182325 A1 | 7/2013 | Minamisawa et al. |
| 2013/0222556 A1 | 8/2013 | Shimada |
| 2013/0229529 A1 | 9/2013 | Lablans |
| 2013/0250045 A1 | 9/2013 | Ki et al. |
| 2013/0250053 A1 | 9/2013 | Levy |
| 2013/0250123 A1 | 9/2013 | Zhang et al. |
| 2013/0260823 A1 | 10/2013 | Shukla et al. |
| 2013/0278785 A1 | 10/2013 | Nomura et al. |
| 2013/0286451 A1 | 10/2013 | Verhaegh |
| 2013/0335598 A1 | 12/2013 | Gustavsson et al. |
| 2013/0335600 A1 | 12/2013 | Gustavsson et al. |
| 2014/0009631 A1 | 1/2014 | Topliss |
| 2014/0016832 A1 | 1/2014 | Kong et al. |
| 2014/0085502 A1 | 3/2014 | Lin et al. |
| 2014/0104378 A1 | 4/2014 | Kauff et al. |
| 2014/0111650 A1 | 4/2014 | Georgiev et al. |
| 2014/0139623 A1 | 5/2014 | McCain et al. |
| 2014/0152852 A1 | 6/2014 | Ito et al. |
| 2014/0184749 A1 | 7/2014 | Hilliges et al. |
| 2014/0192253 A1 | 7/2014 | Laroia |
| 2014/0285673 A1 | 9/2014 | Hundley et al. |
| 2015/0043076 A1 | 2/2015 | Nakayama |
| 2015/0049172 A1 | 2/2015 | Ramachandra et al. |
| 2015/0070562 A1 | 3/2015 | Nayar et al. |
| 2015/0085363 A1 | 3/2015 | Liu et al. |
| 2015/0125092 A1 | 5/2015 | Zhuo et al. |
| 2015/0177524 A1 | 6/2015 | Webster et al. |
| 2015/0201128 A1 | 7/2015 | Dong |
| 2015/0244934 A1 | 8/2015 | Duparre et al. |
| 2015/0253647 A1 | 9/2015 | Mercado |
| 2015/0286033 A1 | 10/2015 | Osborne |
| 2015/0288865 A1 | 10/2015 | Osborne |
| 2015/0370040 A1 | 12/2015 | Georgiev |
| 2015/0371387 A1 | 12/2015 | Atanassov |
| 2015/0373252 A1 | 12/2015 | Georgiev |
| 2015/0373262 A1 | 12/2015 | Georgiev |
| 2015/0373263 A1 | 12/2015 | Georgiev |
| 2015/0373269 A1 | 12/2015 | Osborne |
| 2015/0373279 A1 | 12/2015 | Osborne |
| 2016/0014332 A1 | 1/2016 | De et al. |
| 2016/0085059 A1 | 3/2016 | Mercado |
| 2016/0127641 A1 | 5/2016 | Gove |
| 2016/0127646 A1 | 5/2016 | Osborne |
| 2016/0198087 A1 | 7/2016 | Georgiev et al. |
| 2016/0269602 A1 | 9/2016 | Osborne |
| 2016/0286121 A1 | 9/2016 | Georgiev et al. |
| 2016/0295112 A1 | 10/2016 | Georgiev et al. |
| 2016/0353008 A1 | 12/2016 | Osborne |
| 2017/0026570 A1 | 1/2017 | Shepard et al. |
| 2017/0038502 A1 | 2/2017 | Georgiev |
| 2017/0118421 A1 | 4/2017 | Georgiev |

FOREIGN PATENT DOCUMENTS

| | | |
|---|---|---|
| CN | 101902657 A | 12/2010 |
| CN | 202405984 U | 8/2012 |
| EP | 0610605 A1 | 8/1994 |
| EP | 0751416 A1 | 1/1997 |
| EP | 1176812 A1 | 1/2002 |
| EP | 1383342 A2 | 1/2004 |
| EP | 1816514 A1 | 8/2007 |
| EP | 1832912 A2 | 9/2007 |
| EP | 2242252 A2 | 10/2010 |
| GB | 2354390 A | 3/2001 |
| GB | 2354391 A | 3/2001 |
| JP | H06251127 A | 9/1994 |
| JP | H089424 A | 1/1996 |
| JP | H0847001 A | 2/1996 |
| JP | H08125835 A | 5/1996 |
| JP | 08194274 A | 7/1996 |
| JP | H08242453 A | 9/1996 |

(56) References Cited

FOREIGN PATENT DOCUMENTS

| | | |
|---|---|---|
| JP | H10142490 A | 5/1998 |
| JP | 2001194114 A | 7/2001 |
| JP | 2003304561 A | 10/2003 |
| JP | 3791847 B1 | 6/2006 |
| JP | 2006279538 A | 10/2006 |
| JP | 2007147457 A | 6/2007 |
| JP | 2007323615 A | 12/2007 |
| JP | 2008009424 A | 1/2008 |
| JP | 2009122842 A | 6/2009 |
| JP | 2010041381 A | 2/2010 |
| JP | 2010067014 A | 3/2010 |
| JP | 2010128820 A | 6/2010 |
| JP | 2010524279 A | 7/2010 |
| KR | 20080071400 A | 8/2008 |
| WO | WO-199321560 A1 | 10/1993 |
| WO | WO-1998047291 A2 | 10/1998 |
| WO | WO-2006075528 A1 | 7/2006 |
| WO | WO-2007129147 A1 | 11/2007 |
| WO | WO-2008112054 A1 | 9/2008 |
| WO | WO-2009047681 A1 | 4/2009 |
| WO | WO-2009086330 A2 | 7/2009 |
| WO | WO-2010019757 A1 | 2/2010 |
| WO | WO-2012136388 A1 | 10/2012 |
| WO | WO-2012164339 A1 | 12/2012 |
| WO | WO-2013154433 A1 | 10/2013 |
| WO | WO-2014012603 A1 | 1/2014 |
| WO | WO-2014025588 A1 | 2/2014 |

OTHER PUBLICATIONS

Kawanishi T., et al., "Generation of High-Resolution Stereo Panoramic Images by Omnidirectional Imaging Sensor Using Hexagonal Pyramidal Mirrors", Pattern Recognition, 1998, Proceedings, Fourteenth International Conference on Brisbane, Qld., Australia Aug. 16-20, 1998, Los Alamitos, CA, USA,IEEE Comput. Soc, US, Jan. 1, 1998 (Jan. 1, 1998), pp. 485-489, vol. 1, XP031098377, ISBN: 978-0-8186-8512-5.

Tan K-H., et al., "Multiview Panoramic Cameras Using a Pyramid", Omnidirectional Vision, 2002, Proceedings, Third Workshop on Jun. 2, 2002, Piscataway, NJ, USA,IEEE, Jan. 1, 2002 (Jan. 1, 2002), pp. 87-93, XP010611080, ISBN: 978-0-7695-1629-5.

Arican, et al., "Intermediate View Generation for Perceived Depth Adjustment of Sterio Video", Mitsubishi Electric Research Laboratories, http://www.merl.com, TR2009-052, Sep. 2009; 12 pages.

Hoff, et al., "Surfaces from Stereo: Integrating Feature Matching, Disparity Estimation, and Contour Detection", IEEE Transactions on Pattern Analysis and Machine Intelligence, vol. 11, No. 2, pp. 121-136, Feb. 1989.

Krotkov E., et al., "Active vision for reliable ranging: Cooperating focus, stereo, and vergence", International Journal of Computer Vision. vol. 11, No. 2, Oct. 1, 1993 (Oct. 1, 1993), pp. 187-203, XP055149875, ISSN: 0920-5691. DOI: 10.1007/BF01469228.

Murphy M., et al., "Lens Drivers Focus on Performance in High-Resolution Camera Modules," Analog Dialogue, Nov. 2006, vol. 40, pp. 1-3.

Narkhede, et al., "Stereoscopic Imaging: A Real-Time, In Depth Look," IEEE Potentials, Feb./Mar. 2004, vol. 23, Issue 1, pp. 38-42.

Ricoh Imagine Change: "New RICOH THETA Model, Capturing 360-degree Images in One Shot, is on Sale Soon—Spherical Video Function, API and SDK (Beta Version)", News Release, 2014, 3 pages.

Sun W.S., et al., "Single-Lens Camera Based on a Pyramid Prism Array to Capture Four Images," Optical Review, 2013, vol. 20 (2), pp. 145-152.

Han Y., et al., "Removing Illumination from Image Pair for Stereo Matching", Audio, Language and Image Processing (ICALIP), 2012 International Conference on, IEEE, Jul. 16, 2012, XP032278010, pp. 508-512.

International Search Report and Written Opinion—PCT/US2015/036710—ISA/EPO—Sep. 25, 2015.

Shuchun Y., et al., "Preprocessing for stereo vision based on LOG filter", Proceedings of 2011 6th International Forum on Strategic Technology, Aug. 2011, XP055211077, pp. 1074-1077.

Chowdhury A., et al., "Challenges of Megapixel Camera Module Assembly and Test," Electronic Components and Technology Conference, 2005, pp. 1390-1401.

Hua et al., "Design Analysis of a High-Resolution Panoramic Camera Using Conventional Imagers and a Mirror Pyramid," IEEE Transactions on Pattern Analysis and Machine Intelligence; Feb. 2007; 29(2): 356-361.

Meng et al., "Single-shot Specular Surface Reconstruction with Gonio-plenoptic Imaging," 2015 IEEE International Conference on Computer Vision; pp. 3433-3441.

Second Written Opinion from International Application No. PCT/US2015/036710, dated May 10, 2016, 8 pages.

\* cited by examiner

PARALLAX FREE MULTI-CAMERA SYSTEM CAPABLE OF CAPTURING FULL SPHERICAL IMAGES

CROSS REFERENCE TO RELATED APPLICATIONS

This application claims the benefit of U.S. Provisional Patent Application No. 62/015,329, filed on Jun. 20, 2014, entitled "ULTRA WIDE FIELD OF VIEW ARRAY CAMERA—CAPABLE OF CAPTURING HEMISPHERE, FULL SPHERICAL IMAGES AND OTHER RELATED CONFIGURATIONS," the contents of which is hereby incorporated by reference herein in its entirety.

TECHNICAL FIELD

The present disclosure relates to imaging systems and methods that include a multi-camera system. In particular, the disclosure relates to systems and methods that for capturing and near or full spherical images.

BACKGROUND

Many imaging systems include cameras that may be operated by a user to capture still and/or video images. Because the imaging systems are typically designed to capture high-quality images, it can be important to design the cameras or imaging systems to be free or substantially free of parallax. Moreover, it may be desired for the imaging system to capture an image of a global scene where the captured image is parallax free or substantially parallax free. Imaging systems may be used to capture various fields of view of a global scene from a plurality of locations near a central point. However, many of these designs involve images with a large amount of parallax because the fields of view originate from various locations and not from a central point. A solution is desired to capture an image of a global scene that is parallax free or substantially parallax free.

SUMMARY

An imaging system for capturing a plurality of images which together depict spherical image includes a front camera, a back camera, a set of first cameras, a set of second cameras, and a set of third cameras. The front camera is positioned to capture an image in a first field-of-view (FOV) around a projected optical axis of the front camera. The projected optical axis of the front camera is in a first direction. The back camera is positioned to receive light re-directed by a back re-directing reflective mirror component disposed between the front camera and the back camera. The back camera is positioned to capture an image in a second FOV around a projected optical axis of the back camera. The projected optical axis of the back camera is in the first direction. The set of first cameras is disposed between the front camera and the back camera in a polygon-shaped arrangement. The first cameras are collectively configured to capture images in a third FOV. The FOV is circular-shaped and projecting outward away from the first cameras. At least a portion of the third FOV is between the first FOV and the second FOV. The set of second cameras is disposed between the first cameras and the back camera and in a polygon-shaped arrangement. The second cameras are collectively configured to capture images in a fourth FOV. The fourth FOV is circular-shaped and projecting outward away from the second cameras. At least a portion of the fourth FOV is between the third FOV and the second FOV. The set of third cameras is disposed between the second cameras and the back camera and in a polygon-shaped arrangement. The set of third cameras are collectively configured to capture images in a fifth FOV. The fifth FOV is circular-shaped and projecting outward away from the third cameras. At least a portion of the fifth FOV is between the fourth FOV and the second FOV. The front camera, back camera, first cameras, second cameras and third cameras are configured such that images captured in the first, second, third, fourth and fifth FOV collectively represent a spherical image as seen from a perspective of the imaging system.

An imaging system includes a front camera, a back camera, a plurality of side cameras, a back light re-directing reflective mirror component, and a plurality of side light re-directing reflective mirror components. The front camera has a first field-of-view (FOV) in a first direction and an optical axis that extends through the first FOV. The back camera has an optical axis. The back camera is positioned such that the optical axis of the back camera is aligned in a direction to extend through the first FOV. The plurality of side cameras are disposed between the front camera and the back camera. The back light re-directing reflective mirror component is disposed between the back camera and plurality of side cameras. The back camera and the back light re-directing reflective mirror component are positioned such that the optical axis of the back camera is pointed at the back light re-directing reflective mirror component such that the back camera receives light re-directed by the back light re-directing reflective mirror component along the optical axis of the back camera. Each of the plurality of side cameras positioned to receive light re-directed from one of the plurality of light redirecting mirror components.

A method of generating an image depicting a spherical field-or-view (FOV), the method includes generating a front image, generating a back image, generating first images, generating second images, generating third images, and receiving the front image, back image, first images, second images, and third images. The front image is generated in a front camera positioned to capture an image in a first field-of-view (FOV) around a projected optical axis of the front camera. The projected optical axis of the front camera is in a first direction. The back image is generated in a back camera positioned to receive light re-directed by a back re-directing reflective mirror component disposed between the front camera and the back camera. The back camera is positioned to capture an image in a second FOV. First images are generated in a set of first cameras disposed between the front camera and the back camera in a polygon-shaped arrangement. The first cameras are collectively configured to capture images in a third FOV. The FOV is circular-shaped and projecting outward away from the first cameras. At least a portion of the third FOV is between the first FOV and the second FOV. Second images are generated in a set of second cameras disposed between the first cameras and the back camera and in a polygon-shaped arrangement. The second cameras are collectively configured to capture images in a fourth FOV. The fourth FOV is circular-shaped and projecting outward away from the second cameras. At least a portion of the fourth FOV is between the third FOV and the second FOV. Third images are generated in a set of third cameras disposed between the second cameras and the back camera and in a polygon-shaped arrangement. The third cameras are collectively configured to capture images in a fifth FOV. The fifth FOV is circular-shaped projecting outward away from the third cameras. At least a portion of the fifth FOV being between the fourth FOV and the second FOV. The front image, back image, first images, second images, and third images are received in at least one processor. A mosaicked image is generated with the at least one processor that includes at least a portion of the front image, back image, first images, second images, and third images.

An imaging device includes a means for generating a front image, means for generating a back image, means for generating first images, means for generating second images, means for generating third images, and means for receiving the front image, back image, first images, second images, and third images. The means for generating a front image in a front camera is positioned to capture an image in a first field-of-view (FOV) around a projected optical axis of the front camera. The projected optical axis of the front camera is in a first direction. The means for generating a back image in a back camera is positioned to receive light re-directed by a back re-directing reflective mirror component disposed between the front camera and the back camera. The back camera is positioned to capture an image in a second FOV. The means for generating first images in a set of first cameras is disposed between the front camera and the back camera in a polygon-shaped arrangement. The first cameras are collectively configured to capture images in a third FOV. The third FOV is circular-shaped and projecting outward away from the first cameras. At least a portion of the third FOV is between the first FOV and the second FOV. The means for generating second images in a set of second cameras is disposed between the first cameras and the back camera and in a polygon-shaped arrangement. The second cameras are collectively configured to capture images in a fourth FOV. The fourth FOV is circular-shaped and projecting outward away from the second cameras. At least a portion of the fourth FOV is between the third FOV and the second FOV. The means for generating third images in a set of third cameras is disposed between the second cameras and the back camera and in a polygon-shaped arrangement, and collectively configured to capture images in a fifth FOV. The fifth FOV is circular-shaped projecting outward away from the third cameras. At least a portion of the fifth FOV is between the fourth FOV and the second FOV. A mosaicked image is generated that includes at least a portion of the front image, back image, first images, second images, and third images.

BRIEF DESCRIPTION OF THE DRAWINGS

The disclosed aspects will hereinafter be described in conjunction with the appended drawings and appendices, provided to illustrate and not to limit the disclosed aspects, wherein like designations denote like elements.

DETAILED DESCRIPTION

Figure 1A:
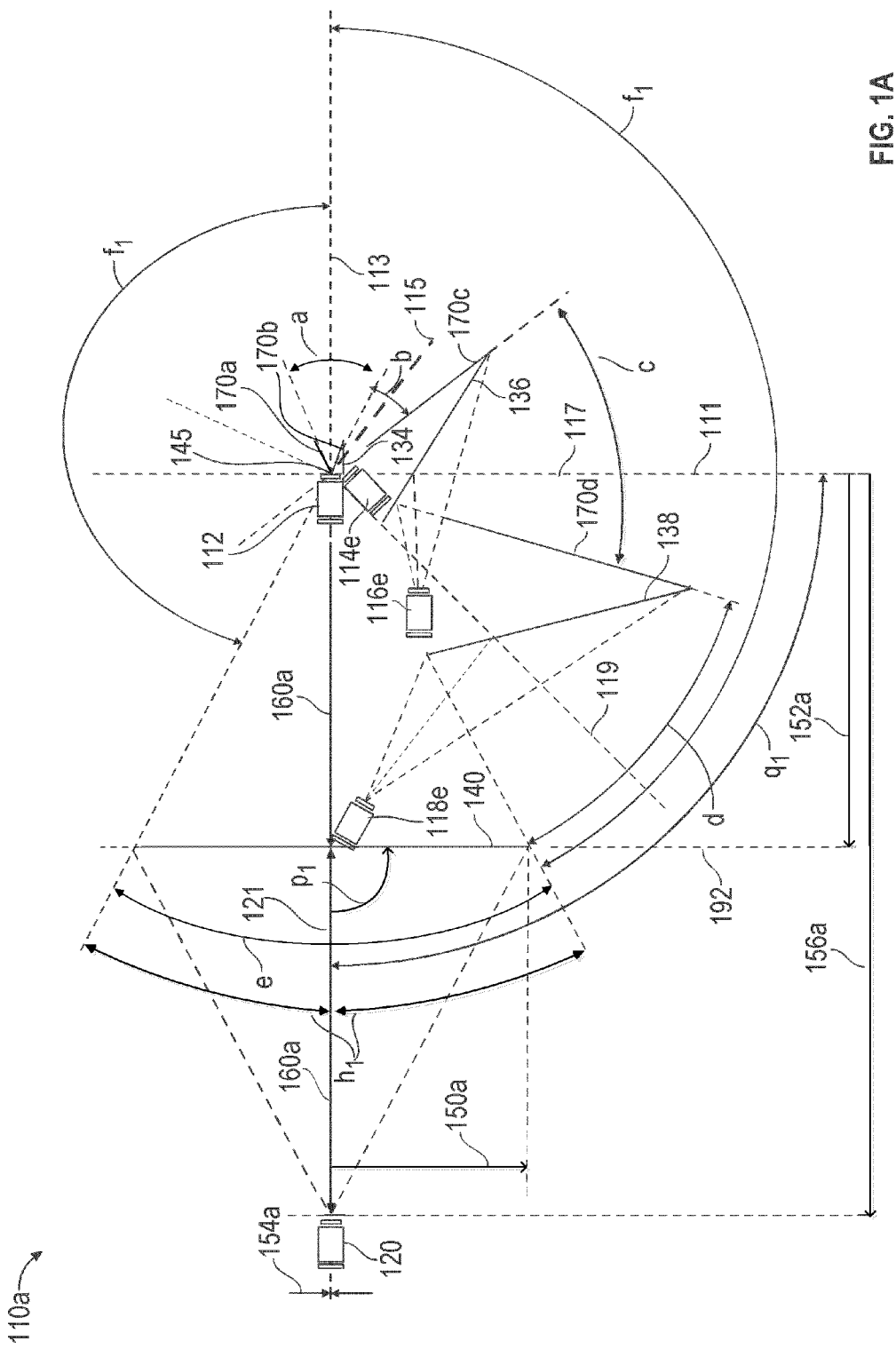
FIG. 1A illustrates a side view of an embodiment of a portion of a global camera configuration including a central camera, a first camera, a second camera, a third camera and a back camera.

Implementations disclosed herein provide systems, methods and apparatus for generating images free or substantially free of parallax and tilt artifacts using an arrangement of a plurality of cameras capable of capturing full spherical images. Aspects of various embodiments relate to an arrangement of a plurality of cameras (e.g., a multi-camera system) exhibiting little or no parallax artifacts in the captured images. The arrangement of the plurality of cameras captures full spherical images, whereby a target scene being captured is partitioned into multiple areas. The images are captured parallax free or substantially parallax free by designing the arrangement of the plurality of cameras such that they appear to have the same virtual common entrance pupil. The problem with some designs is they do not have the same virtual common entrance pupil and thus are not parallax free or stated another way free of parallax artifacts.

Each sensor in the arrangement of the plurality of cameras receives light from a portion of the image scene using a corresponding light redirecting light reflective mirror component (which is sometimes referred to herein as "mirror" or "mirror component"), or a surface equivalent to a mirror reflective surface. Accordingly, each individual mirror component and sensor pair represents only a portion of the total multi-camera system. The complete multi-camera system has a synthetic aperture generated based on the sum of all individual aperture rays. In any of the implementations, all of the cameras may be configured to automatically focus, and the automatic focus may be controlled by a processor executing instructions for automatic focus functionality.

In some embodiments, the multi-camera system has twenty-six cameras, each camera capturing a portion of a target scene such that twenty-six portions of an image may be captured. The system includes a processor configured to generate an image of the scene by combining all or a portion of the twenty-six portions of the image. The twenty-six cameras can be configured as three concentric rings of eight cameras each, a front camera and a back camera. A plurality of light redirecting reflective mirror components are configured to redirect a portion of incoming light to each of the twenty-six cameras except for a central camera. The portion of incoming light from a target scene can be received from areas surrounding the multi-camera system by the plurality of light redirecting reflective mirror components. In some embodiments, the light redirecting reflective mirror components may comprise a plurality of individual components, each having at least one light redirecting reflective mirror component. The multiple components of the light redirecting reflective mirror component may be coupled together, coupled to another structure to set their position relative to each other, or both.

Those skilled in the art of capturing panoramic images may be aware of the meaning of the terms parallax free images (or effectively parallax free images) or parallax artifact free images (or effectively parallax artifact free images). Camera systems as having the property of being parallax free or parallax artifact free.

As an example, cameras systems designed to capture stereographic images using two side-by-side cameras are examples of cameras systems that are not parallax free. One way to make a stereographic image is to capture images from two different vantage points. Those skilled in the art may be aware it may be difficult or impossible, depending on the scene, to stitch both stereographic images together to get one image without having some scene content duplicated or missing in the final stitched image. Such artifacts may be referred to as examples of parallax artifacts. Further, those skilled in the art may be aware that if the vantage points of the two stereographic cameras are moved together so that both look at the scene from one vantage point it should then be possible to stitch the images together in such a way parallax artifacts are not observable.

Herein for parallax free images, when two or more images are stitched together image processing is not used to alter the images by adding content or removing content from the images or the final stitched together image.

Those skilled in the art may be aware you can take a single lens camera and rotate it about a stationary point located at the most center point of its entrance pupil and capture images in all directions. Using these images one may be able to create a spherical image showing all scene content surrounding the center most point of the entrance pupil as if looking outward in any direction from the center of a sphere or globe. These images may have the added property of being parallax free and/or parallax artifact free. Meaning, for example, the images can be stitched together in a way where the scene content is not duplicated in the final spherical image and or the scene content may not be missing from the final stitched spherical image and or have other artifacts that may be considered by those skilled in the art to be parallax artifacts.

It is possible to arrange a system of virtual cameras that share the same center most point of the virtual entrance pupils of all the virtual cameras. The term virtual means two or more physically real cameras can be arranged to appear with other components, such as light redirecting reflective mirror components, to appear as if they share the same entrance pupil center most point. Further it may be possible to arrange all the virtual cameras to have the virtual optical axis of each virtual camera intersecting or very close to intersecting each other near the shared virtual center most point of the virtual entrance pupils. The methods and systems presented herein may be used to realize a similar system.

Physically it is very difficult or nearly impossible to build systems with sufficient tolerance where the virtual optical axis of two or more virtual cameras will intersect at one common point in the center most location of a virtual entrance pupil. It may be possible given the pixel resolutions of a camera system and or the resolution of the lenses to have the optical axis of two or more cameras either intersect or come sufficiently close to intersecting each other near or around the center most point of a shared entrance pupil so that there is little or no parallax artifacts in the stitched together images or, as the case may be, the stitched together images will meet requirements of having less than a minimal amount of parallax artifacts in the final stitched together images. That is, without using special software to add content or remove content or other image processing to remove parallax artifacts, one would be able to take images captured by such cameras and stitch these image together so they produce a parallax free spherical image or meeting requirements of a minimal level of parallax artifacts. In this context one may use the terms parallax free or effectively parallax free based on the system design having sufficient tolerances.

Herein, when the terms parallax free, free of parallax artifacts, effectively parallax free or effectively free of parallax artifacts is used, it is to be understood that the physical realities may make it difficult or nearly impossible to keep physical items in the same location over time or even have the property of being exactly the same as designed without using tolerances. The realities are things may change in shape, size, position, relative position to possible other objects across time and or environmental conditions. As such, it is difficult to talk about an item or thing as being ideal or non-changing without assuming or providing tolerance requirements. Herein the terms such as effectively parallax free shall mean and be taken to mean the realities are most physical items will require having tolerances to where the intended purpose of the assembly or item is being fulfilled even though things are not ideal and may change over time. The terms of parallax free, free of parallax artifacts, effectively parallax free or effectively free of parallax artifacts with or without related wording should be taken to mean that it is possible to show tolerances requirements can be determined such that the intended requirements or purpose for the system, systems or item are being fulfilled.

In the following description, specific details are given to provide a thorough understanding of the examples. However, the examples may be practiced without these specific details.

Figure 1B:
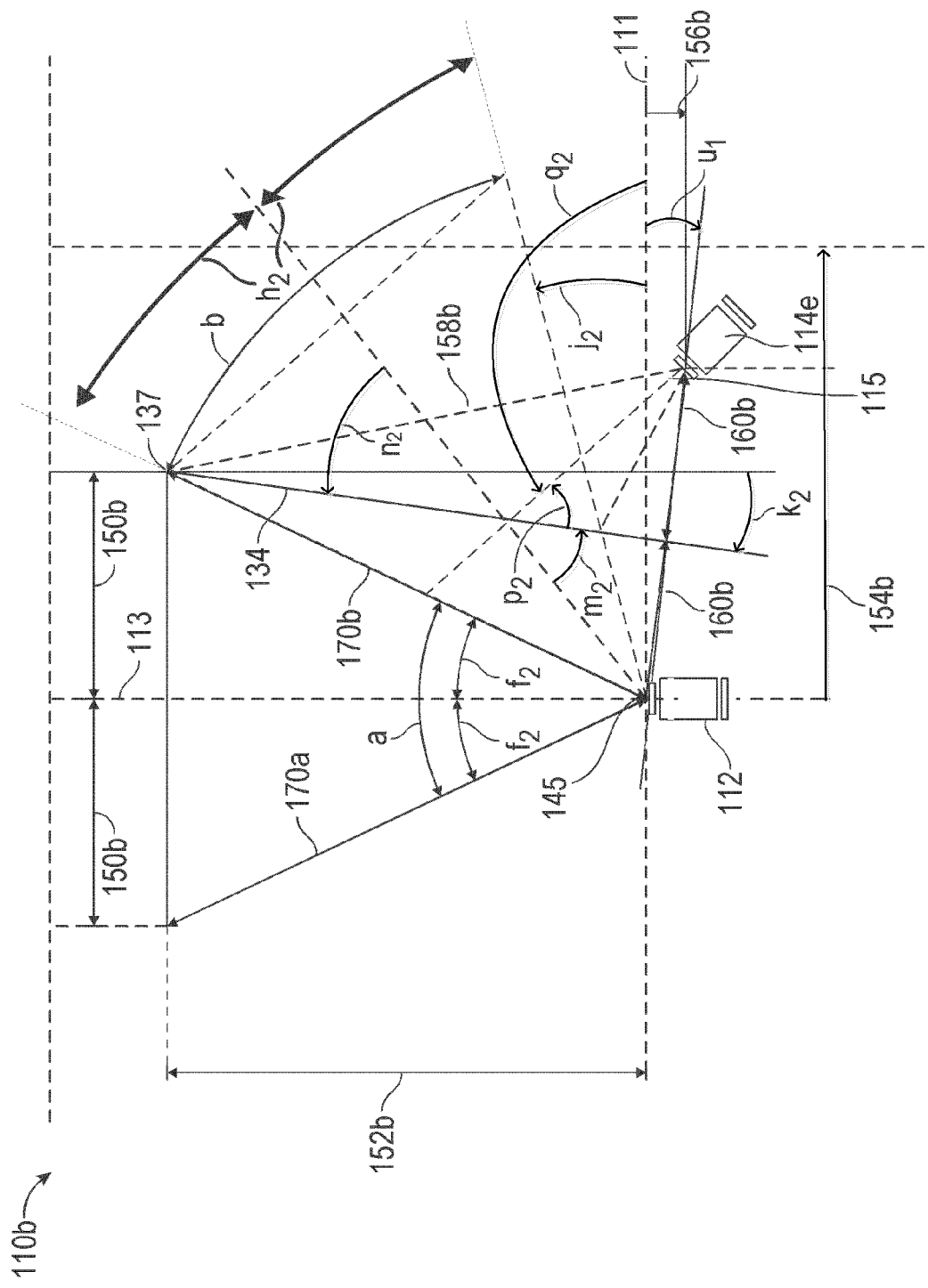
FIG. 1B illustrates a side view of an embodiment of a portion of a global camera configuration including a central camera and a first camera.
Figure 1C:
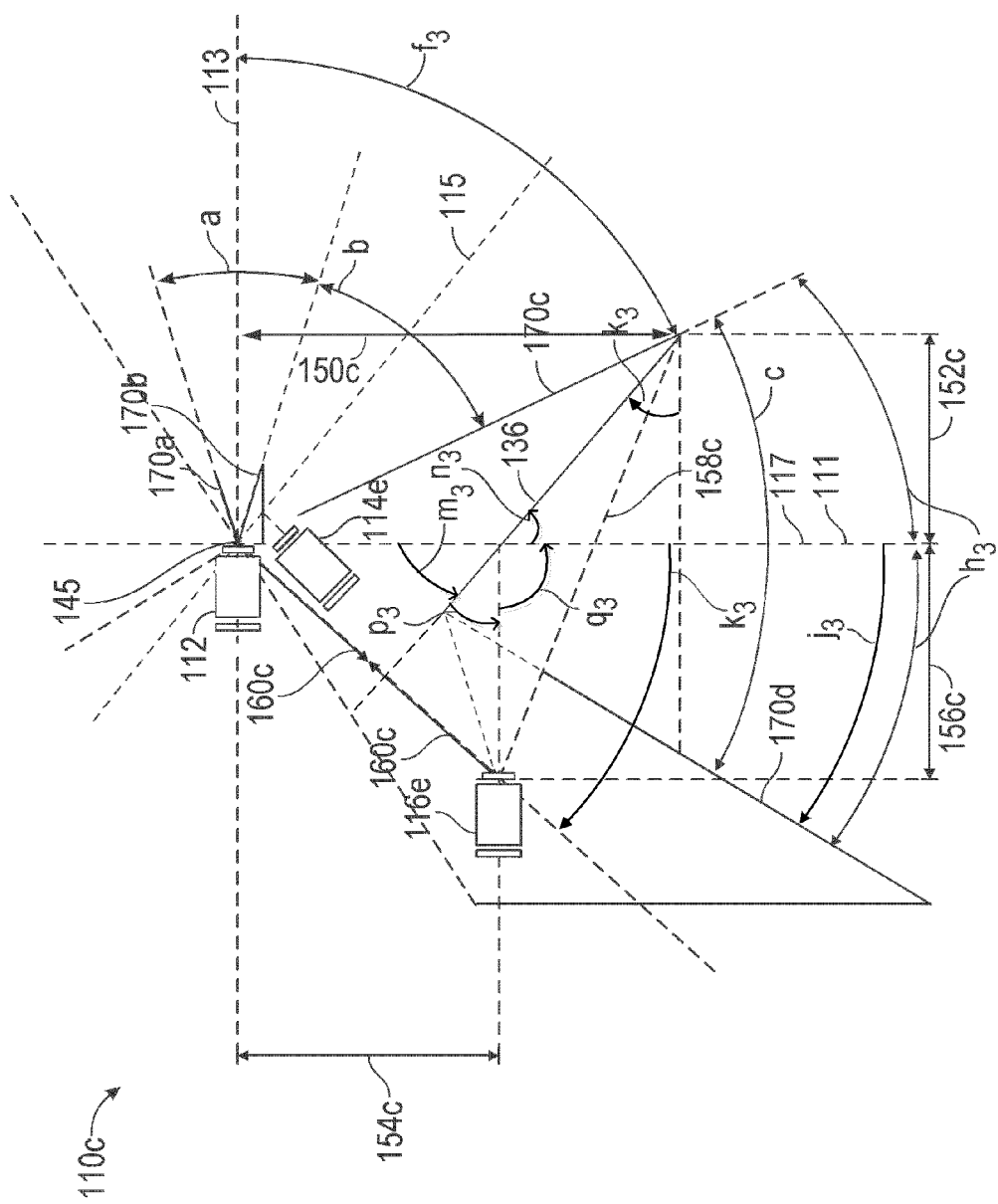
FIG. 1C illustrates a side view of an embodiment of a portion of a global camera configuration including a central camera, a first camera and a second camera.
Figure 1D:
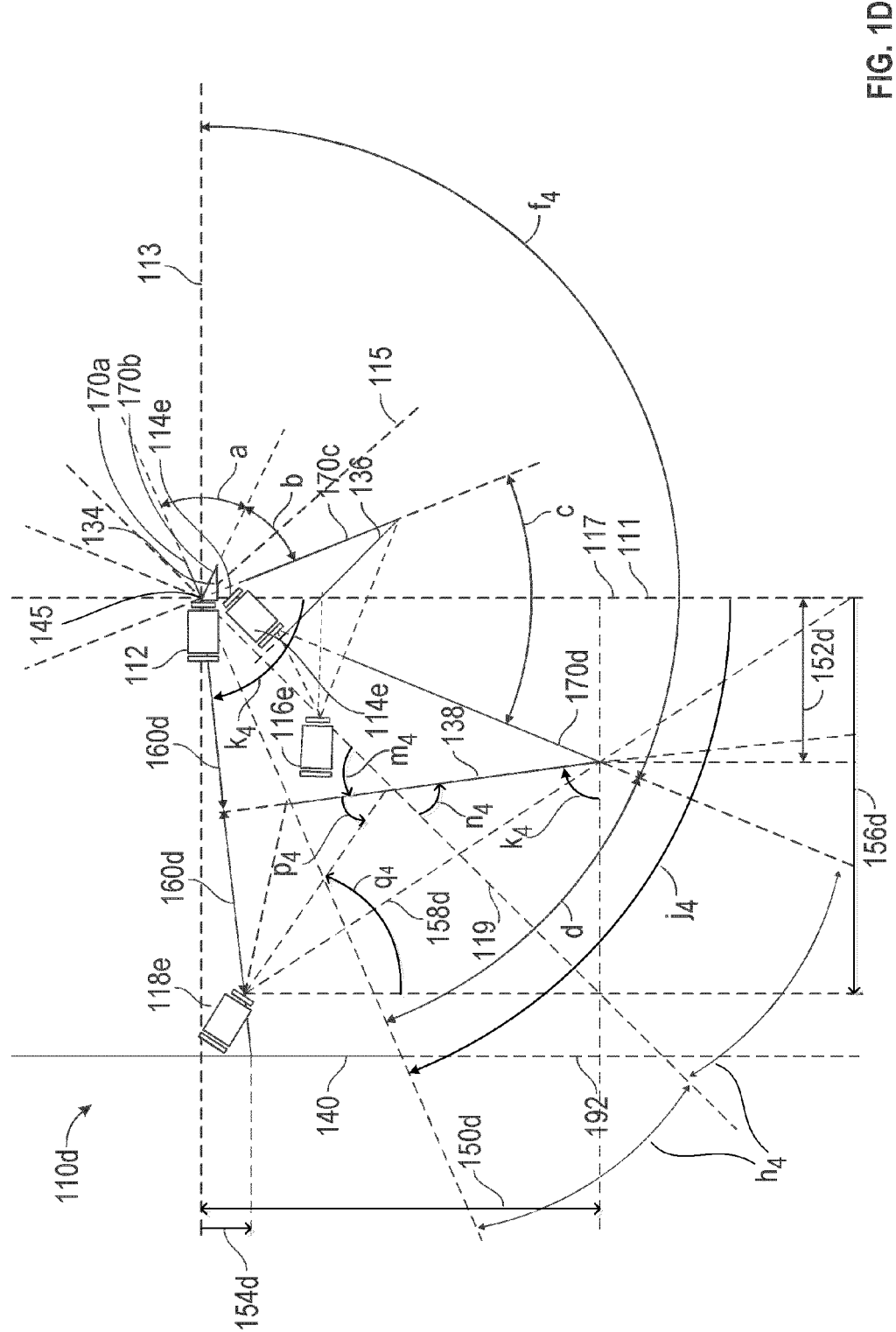
FIG. 1D illustrates a side view of an embodiment of a portion of a global camera configuration including a central camera, a first camera, a second camera and a third camera.
Figure 1E:
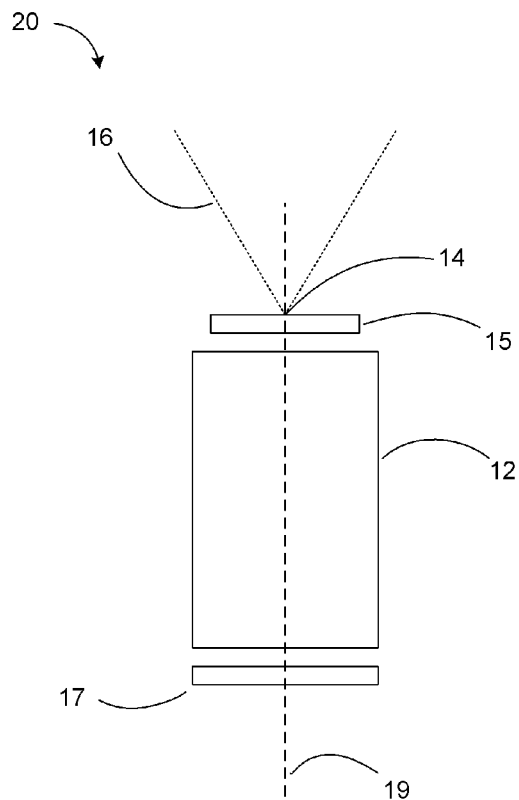
FIG. 1E illustrates an embodiment of a camera shown in FIGS. 1A-D and 2A-C and positive and negative indications of the angles for FIGS. 1A-D.
Figure 1E:
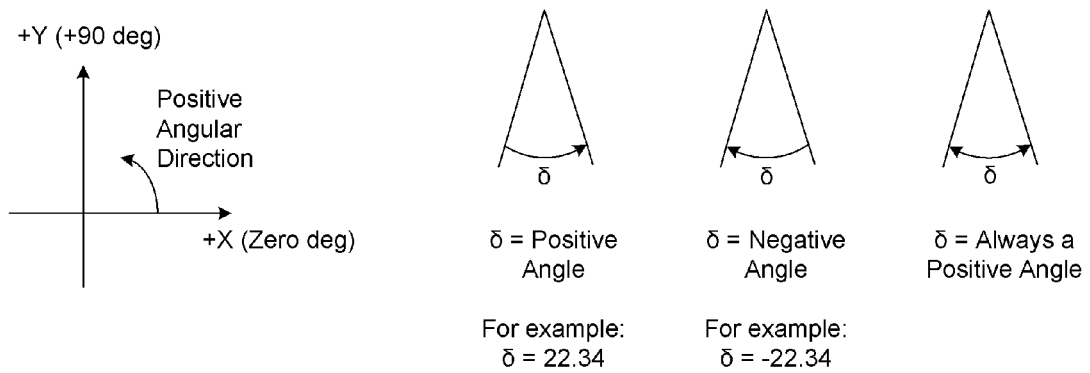

FIG. 1E illustrates an embodiment of a camera 20 shown in FIGS. 1A-D, 2B and 2C and positive and negative indications of the angles for FIGS. 1A-D. The camera 20 includes the center most point of an entrance pupil 14 located on the optical axis 19 and at where the vertex of the Field of View (FoV) 16 intersects the optical axis 19. The embodiment of camera 20 is shown throughout FIGS. 1A-D, 2A-B, and 2C as cameras 112, 114e, 116e, 118e, and 120. The front portion of the camera 20 is represented as a short bar 15. The plane contain the entrance pupil and point 14 is located on the front of 15. The front of the camera and the location of the entrance pupil is symbolized by 15.

Angle designations are illustrated below the camera 20. Positive angles are designated by a circular line pointing in a counterclockwise direction. Negative angles are designated by a circular line pointing in a clockwise direction. Angles that are always positive are designated by a circular line that has arrows pointing in both the clockwise and counterclockwise directions. The Cartesian coordinate system is shown with the positive horizontal direction X going from left to right and the positive vertical direction Y going from the bottom to top. FIGS. 1A-1D present example schematic arrangements of portions 110a, 110b, 110c, 110d of a global camera. Accordingly, the depicted angle sizes, distances, and camera dimensions shown in FIGS. 1A-1D may not be to scale, and may be varied in different implementations of the global camera.

Figure 2A:
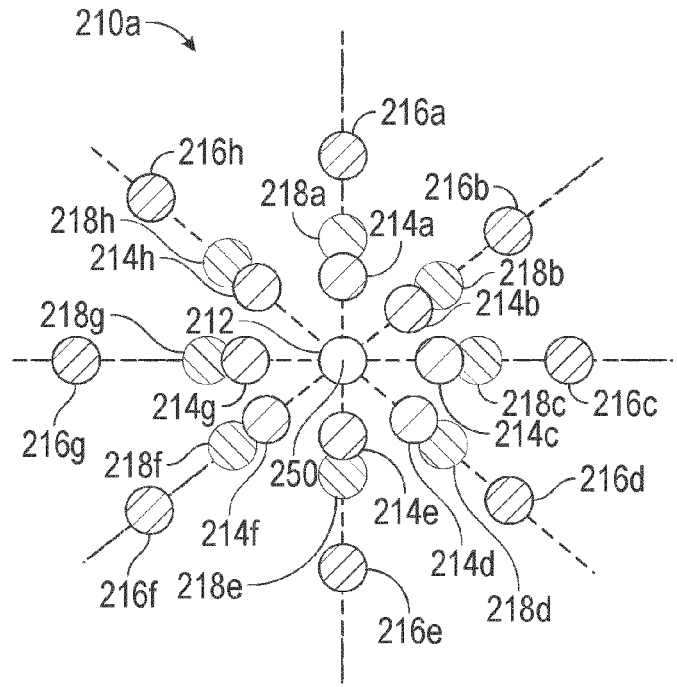
FIG. 2A illustrates a front view of an embodiment of a portion of a global camera configuration including a central camera, a first concentric ring of cameras, a second concentric ring of cameras, a third concentric ring of cameras and a back camera (not shown).
Figure 2B:
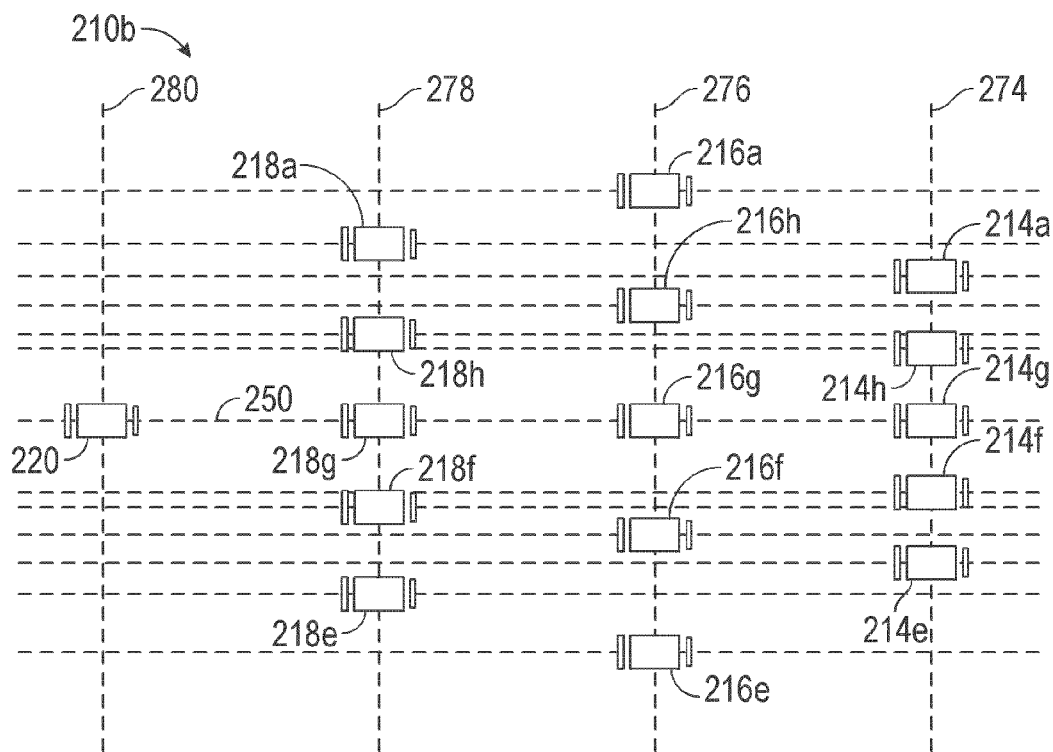
FIG. 2B illustrates a side view of an embodiment of a portion of a global camera configuration including a central camera, a first concentric ring of cameras, a second concentric ring of cameras, a third concentric ring of cameras and a back camera.

FIG. 1A illustrates a side view of an example of one embodiment of a portion of a global (e.g., spherical) camera configuration 110a (for clarity if this illustration) including a central camera 112, a first camera 114e, a second camera 116e, a third camera 118e and a back camera 120. As described herein below the illustrated first camera 114e, second camera 116e and third camera 118e are each part of a group (or arrangement) of first, second, and third cameras. The global configuration 110a also comprises at least several light redirecting reflective mirror components that correspond to the first camera 114e, the second camera 116e, the third camera 118e and the back camera 120. Light redirecting reflective mirror component ("mirror") 134 corresponds to the first camera 114e, mirror 136 corresponds to the second camera 116e, mirror 138 corresponds to the third camera 118e and mirror 140 corresponds to the back camera 120. The mirrors 134, 136, 138, 140 reflect incoming light towards the entrance pupils of each of the corresponding cameras 114e, 116e, 118e, 120. In this embodiment, there is a mirror corresponding to each camera, with the exception of central front camera 112 that does not have an associated mirror. The light received by the central camera 112 and, as shown in FIGS. 2A and 2B, the reflected light received by the first set of eight cameras 214a-h, the second set of eight cameras 216a-h, the third set of eight cameras 218a-h and the back camera 120 from a global scene is used to capture an image as described more fully below with respect to FIGS. 1-5. Although described in terms of mirrors, the light redirecting reflective mirror components may reflect, refract, or redirect light in any manner that causes the cameras to receive the incoming light.

Additionally, the global camera configuration 110a, only a portion of which is illustrated in FIG. 1A, includes a plurality of substantially non-reflective surfaces 170a -d. The plurality of substantially non-reflective surfaces can be any material which does not reflect a significant amount of light that would cause image artifacts, which could be caused by, for example, reflections coming from multiple mirrors. Examples of such materials are dark-colored plastic, wood, metal, etc. In another embodiment, the plurality of substantially non-reflective surfaces 170a -d are slightly in the field of view of each of the respective cameras and digital processing can remove the captured portions of the plurality of substantially non-reflective surfaces 170a -d. In another embodiment, the plurality of substantially non-reflective surfaces 170a -d are slightly out of the field of view of each of the respective cameras.

The imaging system of FIGS. 1A-D includes a plurality of cameras. Central camera 112 is located in a position having a first field of view a directed towards a first direction. The first field of view a, as shown in FIG. 1A, faces a first direction which can be any direction the central camera 112 is facing because the imaging system is configured to capture a global scene. The central camera 112 has an optical axis 113 that extends through the first field of view a. The image being captured by central camera 112 in the first field of view a is around a projected optical axis 113 of the central camera 112, where the projected optical axis 113 of central camera 112 is in the first direction.

The imaging system also includes back camera 120. Back camera 120 has an optical axis 113 that extends through the first field of view a of the central camera 112. The back camera 120 is positioned along a line congruent with the optical axis 113 of the central camera 112. The back camera 120 is positioned to receive incoming light redirected from a back redirecting reflective mirror component 140. The back redirecting reflective mirror component 140 is disposed between the central camera 112 and the back camera 120. The back camera 120 is positioned to capture an image in a second field of view e around a projected optical axis 113 of the back camera 120. The projected optical axis 113 of the back camera 120 is directed in the first direction.

As illustrated in FIG. 1A, represented by first camera 114e, second camera 116e and third camera 118e, the imaging system further includes a plurality of side cameras, 114e, 116e, 118e located between the central camera 112 and back camera 120. Side cameras 114e, 116e, 118e are positioned to capture the portions of the global scene not captured by the central camera 112, back camera 120 and the other side cameras not shown in FIGS. 1A-D. Side cameras 114e, 116e, 118e are offset from the optical axis 113 of the central camera 112.

The illustrated side cameras 114e, 116e, 118e are each cameras of three respective groups or arrangements (or rings) of cameras. The arrangements of each of the side cameras are positioned around the illustrated line 160a which is aligned with the optical axis of the central camera 112. Each of the plurality of side cameras 114e, 116e and 118e may be referred to as a "concentric ring" of cameras, in reference to each of the pluralities of side cameras 114e, 116e, 118e forming a ring which is concentric to the illustrated line 160a which is aligned with the optical axis of the actual camera 112. For clarity, only one camera from each of the rings 114e, 116e, 118e, the central camera 112 and the back camera 120 are shown in FIGS. 1A-D. Side camera 114e is part of a first concentric ring of 8 cameras, each of the 8 cameras being positioned 45 degrees from its neighboring camera to form a 360 degree concentric ring of cameras. Side cameras 114a-d, 114f-h are not shown. Similarly 116e and 118e are part of second and third concentric rings of cameras positioned similarly to the cameras of the first concentric ring of cameras. The term "ring" is used to indicate a general arrangement of the cameras around, for example, line 160a, the term ring does not limit the arrangement to be circular-shaped. The term "concentric" refers to two or more rings that share the same center or axis.

As shown in FIGS. 1A-D, the radius of each concentric ring about the optical axis 113 are shown to be different, whereas in another embodiment, two or more concentric rings may have the same radial distance from the optical axis 113. The concentric rings of cameras 114a-h, 116a-h, 118a-h are in a polygon-shaped arrangement (e.g., octagon). The first concentric ring of cameras 114a-h are arranged and configured to capture images in a third field of view b in a direction along an optical axis 115. The third field of view b projects outward away from the first set of cameras 114a-h. At least a portion of the third field of view b is between the first field of view a in a direction along an optical axis 113 and the second field of view e in a direction along an optical axis 121. The second concentric ring of cameras 116a-h are arranged and configured to capture images in a fourth field of view c in a direction along an optical axis 117. The fourth field of view c projects outward away from the second set of cameras 116a-h. At least a portion of the fourth field of view c is between the third field of view b in a direction along the optical axis 115 and the second field of view e in a direction along the optical axis 121. The third ring of cameras 118a-h are arranged and configured to capture images in a fifth field of view d in a direction along an optical axis 119. The fifth field of view d projects outward away from the third set of cameras 118a-h. At least a portion of the fifth field of view d is between the fourth field of view c in a direction along the optical axis 117 and the second field of view e in a direction along the optical axis 121.

In another embodiment, the side cameras 114e, 116e, 118e are each respectively part of a first, second and third set of array cameras, where each of the first, second and third set of array cameras collectively have a field of view that includes at least a portion of the target scene. Each array camera includes an image sensor. The image sensors of the first set of array cameras are disposed on a first substrate, the image sensors of the second set of array cameras are disposed on a second substrate and the third set of array cameras are disposed on a third substrate. The substrate can be, for example, plastic, wood, etc. Further, the first, second and third substrates are disposed in planes that are parallel.

The central camera 112, back camera 120, first cameras 114a-h, second cameras 116a-h and third cameras 118a-h are configured and arranged such that images captured in the first, second, third, fourth and fifth fields of view a, e, b, c, d collectively represent a spherical image as seen from a perspective of the imaging system.

The imaging system further includes a back light redirecting reflective mirror component 140 disposed between the back camera 120 and plurality of side cameras 114e, 116e, 118e. The back light redirecting reflective mirror component 140 is one type of light redirecting reflective mirror component of the plurality of light redirecting reflective mirror components described above. The back light redirecting reflective mirror component 140 is further disposed perpendicular to the optical axis 113 of the back camera 120.

The imaging system further includes a plurality of side light reflective mirror redirecting components 134, 136, 138. Each of the plurality of side cameras 114e, 116e, 118e are positioned to receive light redirected from one of the plurality of light redirecting reflective mirror components 134, 136, 138.

In each of the above light redirecting reflective mirror components 134, 136, 138, 140, the light redirecting reflective mirror components 134, 136, 138, 140 include a plurality of reflectors.

As will now be described, the global camera configuration 110a comprises various angles and distances that enable the global camera configuration 110a to be parallax free or effectively parallax free and to have a single virtual field of view from a common perspective. Because the global camera configuration 110a has a single virtual field of view, the configuration 110a is parallax free or effectively parallax free.

In some embodiments, the single virtual field of view comprises a plurality of fields of view that collectively view a global scene as if the virtual field of view reference point of each of cameras 112, 114a-h (114e is shown), 116a-h (116e is shown), 118a-h (118e is shown), and 120 have a single point of origin 145, which is the entrance pupil central most point of camera 112, despite some of the cameras being located at various points away from the single point of origin 145. Only cameras 112, 114e, 116e, 118e, and 120 are shown for clarity. For example, central camera 112 captures a portion of a scene according to angle a, its actual field of view from the single point of origin 145, in a direction along the optical axis 113. First camera 114e captures a portion of a scene according to angle b, its virtual field of view from the single point of origin 145, in a direction along the optical axis 115. Second camera 116e captures a portion of a scene according to angle c, its virtual field of view from the single point of origin 145, in a direction along the optical axis 117.

Third camera 118e captures a portion of a scene according to angle d, its virtual field of view from the single point of origin 145, in a direction along the optical axis 119. Back camera 120 captures a portion of a scene according to angle e, its virtual field of view from the single point of origin 145, in a direction along the optical axis 121. Because first camera 114e, second camera 116e and third camera 118e are part of concentric rings of cameras, the collective virtual fields of view will capture a global scene that includes at least the various angles a, b, c, d and e of the virtual fields of views. In order to capture a complete global scene image, all of the cameras 112, 114a-h, 116a-h, 118a-h, 120 individually need to have sufficiently wide enough fields of view to assure all the actual and or virtual fields of view overlap with the actual and or virtual neighboring fields of view.

The single virtual field of view appears as if each of the cameras is capturing a scene from a single point of origin 145 despite the actual physical locations of the cameras being located at various points away from the single point of origin 145. In this embodiment, the single point of origin 145 is located at the entrance pupil of the central camera 112. As such, the virtual field of view of the first camera 114e would be as if the first camera 114e were capturing a scene of field of view b from the entrance pupil of the central camera 112. The virtual field of view of the second camera 116e would be as if the second camera 116e were capturing a scene of field of view c from the entrance pupil of the central camera 112. The virtual field of view of the third camera 118e would be as if the third camera 118e were capturing a scene of field of view d from the entrance pupil of the central camera 112. The virtual field of view of the back camera 120 would be as if the back camera 120 were capturing a scene of field of view e from the entrance pupil of the central camera 112. Accordingly, each of central camera 112, first camera 114e, second camera 116e, third camera 118e and back camera 120 have a single virtual field of view reference point at the single point of origin 145 located at the entrance pupil of the central camera 112 being directed in various directions to capture a global scene.

In other embodiments, various fields of view may be used for the cameras. For example, the central camera 112 may have a wide field of view, the first camera 114e may have a narrow field of view, the second camera 116e may have a wide field of view, the third camera 118e may have a narrow field of view and the back camera 120 may have a wide field of view. As such, the fields of view of each of the cameras need not be the same to capture a parallax free or effectively parallax free image. However, as described below in an example of one embodiment and with reference to the figures and tables, the cameras have actual fields of view of 60 degrees and virtual fields of view of 45 degrees. In the embodiment described below, the fields of view overlap. However, overlapping is not necessary for the imaging system to capture a parallax free or effectively parallax free image.

The above described embodiment of a parallax free or effectively parallax free imaging system and virtual field of view is made possible by various inputs and outputs as listed in the following tables of angles, distances and equations.

The concept of taking multiple images that are free of parallax artifacts or effectively free of parallax artifacts is to capture images of a scene in the object space by pivoting the optical axis of a camera where the center most point of the camera's entrance pupil remains in the same location each time a image is captured. Those skilled in the art of capturing panoramic pictures with none or effectively minimal parallax artifacts may be aware of such a method. To carry out this process one may align the optical axis of camera 112 along the multi-camera system optical axis 113, as shown in FIG. 1B, and place the center most point of camera 112 entrance pupil to contain point 145. At this position an image can be captured. The next step one may rotate clockwise the optical axis of camera 112 by 45 degrees while keeping the point 145 in the center most point of camera 112 entrance pupil and keeping the optical axis of camera 112 in the plane of the page shown FIG. 1B and then capture a second image. Let's further assume the field of view of camera 112 is actually greater than twice the angle $f_2$. Both these images should show similar object space image content of the scene where the fields of view of the two images overlap. When the images are captured in this way it should be possible to merge these two images together to form an image that has no parallax artifacts or effectively no parallax artifacts. Those skilled in the art of merging two or more images together may understand what parallax artifacts may look like and appreciate the objective to capture images that are free of parallax for effectively free of parallax artifacts.

It may not be desirable to capture parallax free or effectively parallax free images by pivoting the optical axis of a camera about its entrance pupil location. It may be preferable to use two cameras fixed in position with respect to each other. In this situation it may not be possible to make two cameras with their entrance pupils occupying the same physical location. As an alternative one may use a light redirecting reflective mirror surface. to create a virtual camera that has its entrance pupil center point containing or nearly containing the entrance pupil center point of another camera such as 112. This is done by appropriately positioning a light redirecting reflective mirror surface, such as surface 134, and a the second camera, such as 114e. FIG. 1B provide a drawing of such a system where a light redirecting reflective mirror surface 134 is used to create a virtual camera of camera 114e, where the center of the virtual camera entrance pupil contains point 145. The idea is to position the light redirecting reflective mirror surface 134 and place camera 114e entrance pupil and optical axis in such a way camera 114e will observe off the light redirecting reflective mirror reflective surface the same scene its virtual camera would observe if the light redirecting reflective mirror surface was not present. It is important to point out the camera 114e may observe only a portion of the scene the virtual camera would observe depending on the size and shape of the light redirecting reflective mirror surface. If the light redirecting reflective mirror surface 134 only occupies part of the field of view of camera 114e then camera 114e would see only part of the scene its virtual camera would see.

Once one selects values for the length $152_b$ and the angles $f_2$, $h_2$ and $k_2$, as shown in FIG. 1B, one can use the equations of Table 2 to calculate the location of camera 114e entrance pupil center point and the angle of its optical axis with respect to line 111. The entrance pupil center point of camera 114e is located a distance $154_b$ from the multi-camera systems optical axis 113 and length $156_b$ from the line 111, which is perpendicular to line 113. FIG. 1E provides the legend showing angular rotation direction depending on the sign of the angle and the direction for lengths from the intersection point of lines 111 and 113 depending on the sign of the length.

TABLE 1

| Inputs | | | |
|---|---|---|---|
| (Distance $152_a$) | −58 | | mm |
| $f_1$ | 157.5 | | deg |
| $h_1$ | 22.5 | | deg |
| $k_1$ | −90 | | deg |

| Outputs | | | |
|---|---|---|---|
| u1 | −90 | = $k_1$ | deg |
| u2 | −180 | = −90 + u1 | deg |
| $j_1$ | −112.5 | = 90 − ($f_1$ + 2 * $h_1$) | deg |
| (Distance $158_a$) | 62.77874762 | = (Distance $152_a$)/cos($f_1$) | mm |
| (Distance $150_a$) | 24.02438662 | = (Distance $158_a$) * sin($f_1$) | mm |
| (Distance $160_a$) | 58 | = (Distance $158_a$) * cos(2 * $h_1$ − u1 + $j_1$) | mm |
| (Distance $156_a$) | −116 | = 2 * (Distance $160_a$) * sin(u1) | mm |
| (Distance $154_a$) | 7.10586E−15 | = 2 * (Distance $160_a$) * cos(u1) | mm |
| $m_1$ | 90 | = 90 − ($h_1$ + $j_1$ − u1) | deg |
| $n_1$ | 90 | = $m_1$ | deg |
| $p_1$ | 90 | = $n_1$ | deg |
| $q_1$ | 90 | = 180 − (180 − ($h_1$ + $j_1$ + $p_1$ + $m_1$)) | deg |

The above distances, angles and equations in Table 1 will now be described with reference to FIG. 1A. With reference to FIGS. 1A-E, the plane of the virtual entrance pupil 111 includes the virtual entrance pupil point 145 and is perpendicular to the optical axis 113. The center most point of the virtual entrance pupil 145 is located ideally at the intersection of the plane 111 and the optical axis 113, where the plane 111 is perpendicular to the page displaying the figure. Ideally, the virtual entrance pupil 145 and the entrance pupil for the center camera 112 coincide with each other. In actual fabrication variations in components and positioning may result in the center point of the entrance pupil 145 not being at the intersection of the optical axis 113 and the plane 111; and, likewise, it may be the actual location and alignment of the entrance pupil of camera 112 may not exactly coincide with the virtual entrance pupil 145, where in these cases we can use the concepts of "effective" or equivalently worded as "effectively" to mean that if it is possible to show tolerances requirements can be determined such that the intended requirements and or purposes for the system, systems or item are being fulfilled, then both the ideal case and within aforementioned tolerances the system, systems and or item may be considered equivalent as to meeting the intended requirements and or purposes. Hence, within tolerances the virtual entrance pupil 145 effectively coincides with the entrance pupil of camera 112 and the center most point of the virtual entrance pupil and the center camera 112 entrance pupil are effectively at the intersection of the optical axis 113 and the plane 111.

Also with reference to FIGS. 1A-E, plane 192 represents the plane of intersection between the light redirecting reflective mirror surface 140 and the optical axis 113 and is perpendicular to the optical axis 113.

The inputs in Table 1 for the positioning of camera 120, as shown in the global camera configuration 110a, are Distance $152_a$, angle angle $h_1$ and angle $k_1$. Distance $152_a$ is the distance between the plane of the virtual entrance pupil 111 and the plane 192. Here, the outer edge of the light redirecting reflective mirror component 140 can be any point along the light redirecting reflective mirror component 140 because light redirecting reflective mirror component 140 is parallel to the plane of the virtual entrance pupil 111.

Angle $f_1$ represents the half angle field of view between the optical axis 113 and the half angle field of view h1 of the camera 120. The back camera 120 will be referred to as the current camera as it pertains to Table 1 for the embodiment shown in FIGS. 1A-D. The meaning of the current camera will change for each of the Tables 1, 2, 3, and 4. For Tables 1, 2, 3, and 4, we will refer to the camera having the half angle field of view of h1 as being the current camera. The current camera as it pertains to Table 1 is camera 120. Further, notice the current camera half angle field of view h1 when summed with the half angle field of view f1 will equal the half angle field of view of 180 degrees for the global camera shown in FIG. 1A.

The current camera and all of the cameras used for an embodiment may each be a camera system containing multiple cameras or may be another type of camera that may be different than a traditional single barrel lens camera. In some embodiments, each camera system used may be made up of an array of cameras or a folded optics array of cameras.

Angle $h_1$ represents half of the actual field of view of the current camera. Here, the current camera is the back camera 120. The total actual field of view of the current camera is two times angle $h_1$, which is 45 degrees.

Angle $k_1$ as shown in FIG. 1A represents the angle between the optical axis 113 and the line formed by light reflective planar surface of component 140 and the plane of the page containing the figure and the optical axis 113.

Angles u1, u2 and $j_1$, shown in Table 1 but not illustrated in FIG. 1A, are used primarily as intermediate values for the equations found in Table 1.

Distance 158 a shown in Table 1 but not shown in FIG. 1A is used primarily as an intermediate value for the equations found in Table 1.

Distance 150a is half the length of the line formed by the light redirecting reflective mirror component 140 and the plane represented by the page containing FIG. 1A. The length of 140 shown in FIG. 1A is two times 150a and the point representing the center of 140 intersects the optical axis 113.

Distance $160_a$ represents half the distance between the entrance pupil of the current camera and the virtual entrance pupil located at the point of origin 145. Here, the current camera is the back camera 120.

Still referring to FIG. 1A, distance length $156_a$ represents the coordinate position from the virtual entrance pupil plane 111 and the plane of the entrance pupil of the current camera, which is parallel to the virtual entrance pupil plane 111. Here, the current camera is back camera 120. The legend for the coordinate system is shown in FIG. 1E.

Distance length $154_a$ represents the coordinate position from the optical axis 113 and the entrance pupil of the camera 120.

Angles $m_1$ and $n_1$ are not shown in FIG. 1A and are intermediate values used for the equations shown in Table 1.

Angle $p_1$ represents the angle from the front side of the light redirecting reflective mirror component corresponding to the current camera and the optical axis of the actual field of view for the current camera. Here, the current camera is back camera 120 and the corresponding light redirecting reflective mirror component is light redirecting reflective mirror component 140. The front side of a the light redirecting reflective mirror component is the side that redirects the light.

Angle $q_1$ represents the angle from the line formed by the plane of the page showing FIG. 1A and the virtual entrance pupil plane 111 to the optical axis of the actual field of view for the current camera. Here, the current camera is back camera 120. Actual field of view means the field of view emanating from the entrance pupil of the actual real camera. In this case the actual real camera for q1 is camera 120.

FIG. 1B illustrates a side view of an example of an embodiment of a portion of a global camera configuration 110b including a central camera 112 and a first camera 114e. In this embodiment, the first camera 114e is the current camera. FIG. 1B also represents a model upon which many different parallax free or effectively parallax free multi-camera embodiments can be conceived of, designed, and/or realized using methods presented herein. Table 2 provides equations used to determine the distances and angles shown in FIG. 1B based on the length $152_b$ and angles $f_2$, $h_2$ and $k_2$.

TABLE 2

| Inputs | | |
|---|---|---|
| (Distance $152_b$) | 4 | mm |
| $f_2$ | 22.5 | deg |
| $h_2$ | 22.5 | deg |
| $k_2$ | 0 | deg |

| Outputs | | | |
|---|---|---|---|
| u1 | 0 | = $k_2$ | deg |
| u2 | −90 | = −90 + u1 | deg |
| $j_2$ | 22.5 | = 90 − ($f_2$ + 2 * $h_2$) | deg |
| (Distance $158_b$) | 4.329568801 | = (Distance $152_b$)/cos($f_2$) | mm |
| (Distance $150_b$) | 1.656854249 | = (Distance $158_b$) * sin($f_2$) | mm |
| (Distance $160_b$) | 1.656854249 | = (Distance $158_b$) * cos(2 * $h_2$ − u1 + $j_2$) | mm |
| (Distance $156_b$) | 0 | = 2 * (Distance $160_b$) * sin(u1) | mm |
| (Distance $154_b$) | 3.313708499 | = 2 * (Distance $160_b$) * cos(u1) | mm |
| $m_2$ | 45 | = 90 − ($h_2$ + $j_2$ − u1) | deg |
| $n_2$ | 45 | = $m_2$ | deg |
| $p_2$ | 45 | = $n_2$ | deg |
| $q_2$ | 135 | = 180 − (180 − ($h_2$ + $j_2$ + $p_2$ + $m_2$)) | deg |

The above distances, angles and equations have a similar relationship as described above with respect to FIG. 1A. Some of the inputs of Table 2 differ from the inputs of Table 1. The main distinctions between the above distances, angles and equations will be distinguished from FIG. 1A. In FIG. 1A and Table 1, some of the distances have a subscript "a" and some of the angles have a subscript "1". These subscripted distances and angles of Table 1 have a similar relationship to the subscripted distances and angles of FIG. 1B and Table 2. In FIG. 1B and Table 2, some of the distances have a subscript "b" and some of the angles have a subscript "2". Thus, the distance and angle relationships described above with respect to FIG. 1A and Table 1 can be similarly used to compute the distances and angles of FIG. 1B and Table 2.

In FIG. 1B, the angles and distances of Table 2 are illustrated. The central camera 112 and first camera 114e are shown. The entrance pupil of the first camera 114e is offset from the virtual entrance pupil 145 according to Distance $154_b$ and Distance $156_b$. Distance length $154_b$ represents the coordinate position from the optical axis 113 and the entrance pupil center point of the first camera 114e, where the distance 154b is measured perpendicular to the optical axis 113. Here, the current camera is first camera 114e.

Distance length $156_b$ represents the coordinate position from the plane 111 and a plane containing the entrance pupil center point of the first camera 114e and is parallel to plane 111. Here, the current camera is first camera 114e.

Still referring to FIG. 1B, point 137 shown in FIG. 1B for system 110b is located on the plane of the page showing FIG. 1B and is distance 150b from the optical axis 113 and distance 152b from the line formed by the intersection of plane 111 and the plane of the page for FIG. 1B. For ease of explaining sometimes we will refer to line 111, which is to be understood as the line formed by the intersection of plane 111 and the plane of the page showing the figure, for example, one of the FIGS. 1A-D.

Planar light redirecting reflective mirror surface 134 is shown with a the line formed by the intersection of the planar surface 134 and the plane of the page showing FIG. 1B. For the purpose of explaining FIG. 1B and FIGS. 1A, 1C and 1D we will assume planar surface 134 is perpendicular to the plane of the page. However, it is important to point out that a the planar surface 134 does not have to be perpendicular to the plane of the page.

When we refer to line 134 it is to be understood we are referring to the line formed by the intersection of planar surface 134 and the plane of the page.

Table 2 provides the angle $k_2$ which is the clock wise rotation angle to the line 134 From a line parallel to the optical axis 113 and also contains point 137. The field of view edges of camera 112 is shown by the two intersecting lines labeled 170a and 170b, where these two lines intersect at the center point of the entrance pupil of camera 112. The half angle field of view of camera 112 is $f_2$ between the multi-camera optical axis 113 and the field of view edge 170a and 170b.

As shown in FIG. 1B camera 112 has its optical axis coinciding with line 113. The half angle field of view of camera 114e is $h_2$ with respect to camera 114e optical axis 115. The optical axis of the virtual camera for camera 114e is shown being redirected off of light redirecting reflective mirror surface 134. Assume the light redirecting reflective mirror surface 134 is perfectly flat and is a plane surface perpendicular to the plane of the page FIG. 1B is shown on. Further assume the light redirecting reflective mirror planar surface 134 fully covers the field of view of camera 114e. As shown in FIG. 1B, the optical axis 115 intersects at a point on the planar light redirecting reflective mirror surface 134. Counter clockwise angle $p_i$ is shown going from light redirecting reflective mirror surface 134 to the optical axis 115 of camera 114e. Based on the properties of light reflection off a mirror or equivalent light reflecting mirror surface, and the assumption the lines shown in FIG. 1B are contained in the plane of FIG. 1B, we find counter clockwise angels m2 and n2 are equal to $p_2$. A light ray may travel along the optical axis 115 towards camera 114e within the plane of the page showing FIG. 1B and reflect off the light redirecting reflective mirror equivalent surface 134 towards the center point of the entrance pupil of camera 114e, where the angles $n_2$ and $p_2$ must be equivalent based on the properties of light reflection off mirror equivalent surfaces. The optical axis 115 is shown extending pass the light reflecting surface 134 towards the virtual entrance pupil center point 145. Counter clockwise rotation angle $m_2$ can be shown to be equal to $n_2$ based on trigonometry.

From this we it can be shown the planar light redirecting reflective mirror surface 134 will intersect perpendicularly the line going from the entrance pupil center point of camera 112 to the entrance pupil center point of camera 114e. Hence the two line lengths 160b can be shown to be equal distant.

It is possible the planar light redirecting reflective mirror surface 134 covers only part of the field of view of camera 114e. In this case not all the rays that travel from the object space towards the virtual camera entrance pupil that contains at its center the point 145, as shown in FIG. 1B, will reflect off the planar portion of a light redirecting reflective mirror surface 134 that partially covers the field of view of camera 114e. From this perspective it is important to keep in mind camera 114e has a field of view defined by half angel field of view $h_2$, the optical axis 115 and the location of its entrance pupil as described by lengths 154b and 156b and the legend shown in FIG. 1E. Within this field of view a surface such as the light reflecting planar portion of the light redirecting reflective mirror surface 134 may be partially in its field of view. The light rays traveling from the object space toward the entrance pupil of the virtual camera of camera 114e and reflect off the planar portion of light redirecting reflective mirror surface 134 will travel onto the entrance pupil of camera 114e provided the planar portion of light redirecting reflective mirror surface 134 and cameras 112 and 114e are positioned as shown in FIG. 1B, and in accordance with the legend shown on FIG. 1E, the equations of Table 2 and in accordance with the input values 152b, $f_2$, $h_2$ and $k_2$.

TABLE 3

| Inputs | | |
|---|---|---|
| (Distance 152$_c$) | 10 | mm |
| $f_3$ | 67.5 | deg |
| $h_3$ | 22.5 | deg |
| $k_3$ | −45 | deg |

| Outputs | | | |
|---|---|---|---|
| u1 | −45 | = $k_3$ | deg |
| u2 | −135 | = −90 + u1 | deg |
| $j_3$ | −22.5 | = 90 − ($f_3$ + 2 * $h_3$) | deg |
| (Distance 158$_c$) | 26.1312593 | = (Distance 152$_c$)/cos($f_3$) | mm |
| (Distance 150$_c$) | 24.14213562 | = (Distance 158$_c$) * sin($f_3$) | mm |
| (Distance 160$_c$) | 10 | = (Distance 158$_c$) * cos(2 * $h_3$ − u1 + $j_3$) | mm |
| (Distance 156$_c$) | −14.14213562 | = 2 * (Distance 160$_c$) * sin(u1) | mm |
| (Distance 154$_c$) | 14.14213562 | = 2 * (Distance 160$_c$) * cos(u1) | mm |
| $m_3$ | 45 | = 90 − ($h_3$ + $j_3$ − u1) | deg |
| $n_3$ | 45 | = $m_3$ | deg |
| $p_3$ | 45 | = $n_3$ | deg |
| $q_3$ | 90 | = 180 − (180 − ($h_3$ + $j_3$ + $p_3$ + $m_3$)) | deg |

FIG. 1C illustrates a side view of an example of an embodiment of a portion of a global camera configuration 110c including a central camera 112, a first camera 114e and a second camera 116e. In this embodiment, the second camera 116e is the current camera.

The above distances, angles and equations have a similar relationship as described above with respect to FIGS. 1A and 1B. Some of the inputs of Table 3 differ from the inputs of Tables 1 and 2. The main distinctions between the above distances, angles and equations will be distinguished from FIG. 1A. In FIG. 1A and Table 1, some of the distances have a subscript "a" and some of the angles have a subscript "1". These subscripted distances and angles of Table 1 have a similar relationship to the subscripted distances and angles of FIG. 1C and Table 3. In FIG. 1C and Table 3, some of the distances have a subscript "c" and some of the angles have a subscript "3". Thus, the distance and angle relationships described above with respect to FIG. 1A and Table 1 can be similarly used to compute the distances and angles of FIG. 1C and Table 3.

In FIG. 1C, the angles and distances of Table 3 are illustrated. The central camera 112, first camera 114e and second camera 116e are shown. The entrance pupil of the second camera 116e is offset from the virtual entrance pupil 145 according to Distance 154$_c$ and Distance 156c. Distance length 154$_c$ represents the coordinate position from the optical axis 113 and to the entrance pupil center point of the second camera 116e, where the direction and orientation of the coordinate system is shown in FIG. 1E. Here, the current camera is second camera 116e.

Distance length $156_c$ represents the coordinate position from the plane 111 and a plane containing the entrance pupil center point of the second camera 116e and is parallel to plane 111. Here, the current camera is second camera 116e.

The remaining distances and angles can be found in Table 3 and are illustrated in FIG. 1C. The relationship of the distances and angles found in Table 3 and illustrated in FIG. 1C can be correlated with the distances and angles found in Table 1 and illustrated in FIG. 1A and Table 2 and illustrated in FIG. 1B.

FIG. 1D illustrates a side view of an embodiment of a portion of a global camera configuration 110d including a central camera 112, a first camera 114e, a second camera 116e and a third camera 118e. In this embodiment, the third camera 118e is the current camera.

TABLE 4

| Inputs | | |
|---|---|---|
| (Distance $152_d$) | −20 | mm |
| $f_4$ | 112.5 | deg |
| $h_4$ | 22.5 | deg |
| $k_4$ | −85 | deg |

| Outputs | | | |
|---|---|---|---|
| u1 | −85 | $= k_4$ | deg |
| u2 | −175 | $= -90 + u1$ | deg |
| $j_4$ | −67.5 | $= 90 - (f_4 + 2 * h_4)$ | deg |
| (Distance $158_d$) | 52.2625186 | $= (\text{Distance } 152_d)/\cos(f_4)$ | mm |
| (Distance $150_d$) | 48.28427125 | $= (\text{Distance } 158_d) * \sin(f_4)$ | mm |
| (Distance $160_d$) | 24.13214549 | $= (\text{Distance } 158_d) * \cos(2 * h_4 - u1 + j_4)$ | mm |
| (Distance $156_d$) | −48.08063077 | $= 2 * (\text{Distance } 160_d) * \sin(u1)$ | mm |
| (Distance $154_d$) | 4.206510128 | $= 2 * (\text{Distance } 160_d) * \cos(u1)$ | mm |
| $m_4$ | 50 | $= 90 - (h_4 + j_4 - u1)$ | deg |
| $n_4$ | 50 | $= m_4$ | deg |
| $p_4$ | 50 | $= n_4$ | deg |
| $q_4$ | 55 | $= 180 - (180 - (h_4 + j_4 + p_4 + m_4))$ | deg |

The above distances, angles and equations have a similar relationship as described above with respect to FIGS. 1A-C. Some of the inputs of Table 4 differ from the inputs of Tables 1-3. The main distinctions between the above distances, angles and equations will be distinguished from FIG. 1A. In FIG. 1A and Table 1, some of the distances have a subscript "a" and some of the angles have a subscript "1". These subscripted distances and angles of Table 1 have a similar relationship to the subscripted distances and angles of FIG. 1D and Table 4. In FIG. 1D and Table 4, some of the distances have a subscript d and some of the angles have a subscript 4. Thus, the distance and angle relationships described above with respect to FIG. 1A and Table 1 can be similarly used to compute the distances and angles of FIG. 1D and Table 4.

In FIG. 1D, the angles and distances of Table 4 are illustrated. The central camera 112, first camera 114e, second camera 116e and third camera 118e are shown. The entrance pupil of the third camera 118e is offset from the virtual entrance pupil 145 according to Distance $154_d$ and Distance $156_d$. Distance length $154_d$ represents the coordinate position from the optical axis 113 and the entrance pupil center point of the third camera 118e, where the distance $154_d$ is measured perpendicular to the optical axis 113. Here, the current camera is the third camera 118e.

Distance $156_d$ represents the coordinate position from the plane 111 and a plane containing the entrance pupil center point of the third camera 118e and is parallel to plane 111. Here, the current camera is third camera 118e.

The remaining distances and angles can be found in Table 4 and are illustrated in FIG. 1D. The relationship of the distances and angles found in Table 4 and illustrated in FIG. 1D can be correlated with the distances and angles found in Table 1 and illustrated in FIG. 1A, Table 2 and illustrated in FIG. 1B and Table 3 and illustrated in FIG. 1C.

An explanation of one way to design a multi-camera system will now be explained. One approach is to develop a multi-camera system using the model shown in FIG. 1B, the legend shown in FIG. 1E and the equations shown in Table 2. One of the first decisions is to determine if the central camera 112 will be used. If the central camera 112 is not to be used then half angle field of view $f_2$ should be set to zero. Next the half angle field of view $h_2$ may be selected based on other considerations those designing such a system may have in mind. The length 152b will scale the size of the multi-camera system. One objective while developing a design is to assure the sizes of the cameras that may or will be used will fit in the final structure of the design. The length 152b can be changed during the design phase to find a suitable length accommodating the cameras and other components that may be used for the multi-camera system. There may be other considerations to take into account when selecting a suitable value for 152b. The angle of the light redirecting reflective mirror planar surface $k_2$ can be changed with the objective of finding a location for the entrance pupil of camera 114e using lengths 154b and 156b and the legend shown on FIG. 1E and the optical axis angle $q_2$ of camera 114e. One may want the widest multi-camera image one may be able to obtain by merging together all the images from each camera in the system. In such a case it is desirable to keep each camera out of the fields of view of all the cameras. One may need to try different inputs for 152b, $f_2$, $h_2$, and $k_2$ until the desired combined image field of view is achieved while keeping the images of other cameras out of this combined field of view.

Once a multi-camera system has been specified by inputs 152b, $f_2$, $h_2$, and $k_2$ according to Table 2 and FIGS. 1B and 1E, we can label this multi-camera system as the First Camera stage. We can used the model shown in FIG. 1B again where the First Camera Stage will be used for the central camera 112 this time.

We now design the Second Camera Stage by using FIG. 1B again and used the First Camera Stage as the central camera 112. We will need to select a height $152_b$ that will work with the half angle f2 selected for the Second Camera Stage.

In this case the half angle field of view $f_2$ selected for the Second Stage may be less in degrees than the actual imaged observed by the First Camera stage. The choice of what value to put for $f_2$ will depend on the objectives and goals of the designer.

Let's assume a value for $f_2$ has been selected and the question is what half angle field of view should be selected for $h_2$ of the surrounding cameras making up the Second Camera Stage that includes the First Camera stage as the center camera of the Second Camera stage. All the cameras can have a different half angle field of view from each other, but let's assume all the surrounding cameras 114e of the Second Camera stage will have the same half angle field of view $h_2$. It is desirable to choose a length for 152b of the Second Camera stage that will fit with the First Camera stage and the angles $h_2$ and $k_2$ to keep all of the cameras out of the field of view of each other and physically possible to place the cameras within a realizable structure. FIG. 1A will help to explain these objectives. The input values 152, f, h and k of Tables 1 through 4 where selected with respect to the camera 114e with a known sized between the light redirecting reflective mirror surface 136 and a black non-reflective or minimally none reflective surface 170c; e.g., camera 114e may need to fit between surfaces 170c and 136 based on the objectives for the design. Surface 170c, may limit the field of view observed by camera 114e, as shown in FIG. 1A. The field of view of camera 114e may be further limited by the light redirecting reflective mirror surface 134 that may occupy only a portion of the field of view of camera 114e; e.g., light redirecting reflective mirror surface 134 may be thought of as an object within the field of view of camera 114e that may not fully fill the field of view of camera 114e. Camera 116e of the Second Camera stage may have its field of view limited by the non-reflective or minimally reflective surface 170d and the light redirecting reflective mirror surface 136. Light redirecting reflective mirror surface serves an additional function, where the length of light redirecting reflective mirror surface 136 may be extended so camera 114e may not be observed by camera 116e. It may not be necessary to block out camera 114e from being in the image of 116e because the image of 114e could be cropped out. There may be other considerations that may make it desirable to block out the image of camera 114e from appearing in camera 116e field of view.

Once the design for the Second Camera stage, which includes the First Camera stage is complete, one can use FIG. 1B and Table 2 again to design a Third Camera stage where we use the Second Camera stage as the center camera for camera 112 shown in FIG. 1B and repeat in a similar way the approach used for designing the Second Camera stage.

In the embodiment shown in FIG. 1A a single camera 120 is shown for the Fourth Camera stage with its optical axis coincident with the multi-camera system optical axis 113 and a light redirecting reflective mirror surface 140 at a location previously described above. The light redirecting reflective mirror surface 140 location and orientation is described using Table 1 and the model shown in FIGS. 1B and 1E.

It is not necessary to use a single camera such as camera 120 shown in FIG. 1A. The camera 120 may be made up of a multiple camera system as described above for the First Stage camera and or more stages such as a the Second, a the Third or more Stages.

In an alternative embodiment of FIG. 1A, it may be possible to use multiple cameras that view the object space pointing generally in the opposite direction of the direction the First Camera stage is view.

There may be more or less camera stages than a the First Camera stage, a the Second Camera stage, a the Third Camera stage and or a Fourth Camera stage and or more stages. By using more or less camera stages you may be able to devise, design or conceive of a wide field of view camera, a hemisphere wide field of view camera or a ultra wide field of view camera greater than a hemisphere that, for example may not make use of a rear camera such as camera 120. An actual design depends on the choices made while developing a multi-camera system. As previously stated it is not necessary for any of the cameras to have the same field of view as any of the other cameras. All of the light redirecting reflective mirror surfaces do not have to have the same shape, size or orientation with respect to the closes camera viewing that light redirecting reflective mirror surface. It is also not necessary for all the cameras to fully overlap the fields of view of the neighboring images in order to have a multi-camera system described as being capable of capturing parallax free or effectively parallax free images.

In model FIG. 1B we show the optical axis 115 intersecting the light redirecting reflective mirror surface 134. It can be shown that a multi-camera system such as that shown in FIG. 1B will still be parallax free or effectively parallax free if the intersection point described by above is moved to any location on the planar light redirecting reflective mirror surface 134. As described above, the intersection point is the point where the optical axis 115 of camera 114e intersects to optical axis of its virtual camera and the intersection point is located on the planar light redirecting reflective mirror surface 134.

In a multi-camera parallax free or effectively parallax free camera system the fields of view of each of the cameras used do not have to be equal.

It may be possible to design a parallax free or effectively parallax free multi-camera system where the light redirecting reflective mirror surfaces represented by light redirecting reflective mirror surface 134 in FIG. 1B in such a way that surface 134 is not planar but could reflect or refract light that is part of the design of an overall camera system.

FIG. 2A illustrates a front view of an embodiment of a portion of a global camera configuration 210a including a central camera 212, a first ring of cameras 214a-h, a second concentric ring of cameras 216a-h, a third concentric ring of cameras 218a-h and a back camera (not shown). For clarity, the light redirecting reflective mirror components and effectively non-reflective surfaces are not shown.

Each of the cameras in each of the respective concentric rings are located 45 degrees from each of the neighboring cameras for the respective concentric ring. For example, camera 216a is located at a position 45 degrees from camera 216b relative to the plane of b cameras and the plane of a cameras. Camera 216a is further located at a position 45 degrees from camera 216h relative to the plane of h cameras and the plane of a cameras.

Each of the cameras for each of the respective concentric rings are equidistant from axis 250 extending from the central camera 212 to the back camera. For example, cameras 216a-h are all equidistant from axis 250.

In this embodiment, the back camera is not shown because the back camera is located behind the front camera. Additionally, the locations of the cameras are for illustrative purposes to show the relative location of each camera. Each camera may be tilted to capture the fields of view according to the configurations discussed above with respect to FIGS. 1A-D.

In this illustration, the first concentric ring, the second concentric ring and the third concentric ring are shown as each having eight cameras. Additional cameras could be added to increase the quality of the global image being captured. Additional concentric rings could be added to increase the quality of the global image being captured.

FIG. 2B illustrates a side view of an embodiment of a portion of a global camera configuration 210b including a central camera (not shown), a first concentric ring of cameras 214a-h (214b-d are not shown), a second concentric ring of cameras 216a-h (216b-d are not shown), a third concentric ring of cameras 218a-h (218b-d are not shown) and a back camera 220.

Each of the cameras in each of the respective concentric rings are located in the same plane for the respective concentric ring. For example, cameras 216a-h are located along plane 276. Similarly, cameras 214a-h are located along plane 274 and cameras 218a-h are located along plane 278. Back camera 220 is located along plane 280. In the illustrative embodiment, the planes 274, 276 278, 280 are parallel or substantially parallel. Axis 250 illustrates the optical axis of back camera 220, which is the same virtual axis as the optical axis for the central camera.

In this embodiment, the locations of the cameras are for illustrative purposes to show the relative location of each camera. Each camera may be tilted to capture the fields of view according to the configurations discussed above with respect to FIGS. 1A-D.

In this illustration, the first concentric ring, the second concentric ring and the third concentric ring are shown as each having eight cameras (cameras b-d for each concentric ring are hidden behind cameras of the respective concentric ring). Additional cameras could be added to increase the quality of the global image being captured. Additional concentric rings could be added to increase the quality of the global image being captured.

Figure 2C:
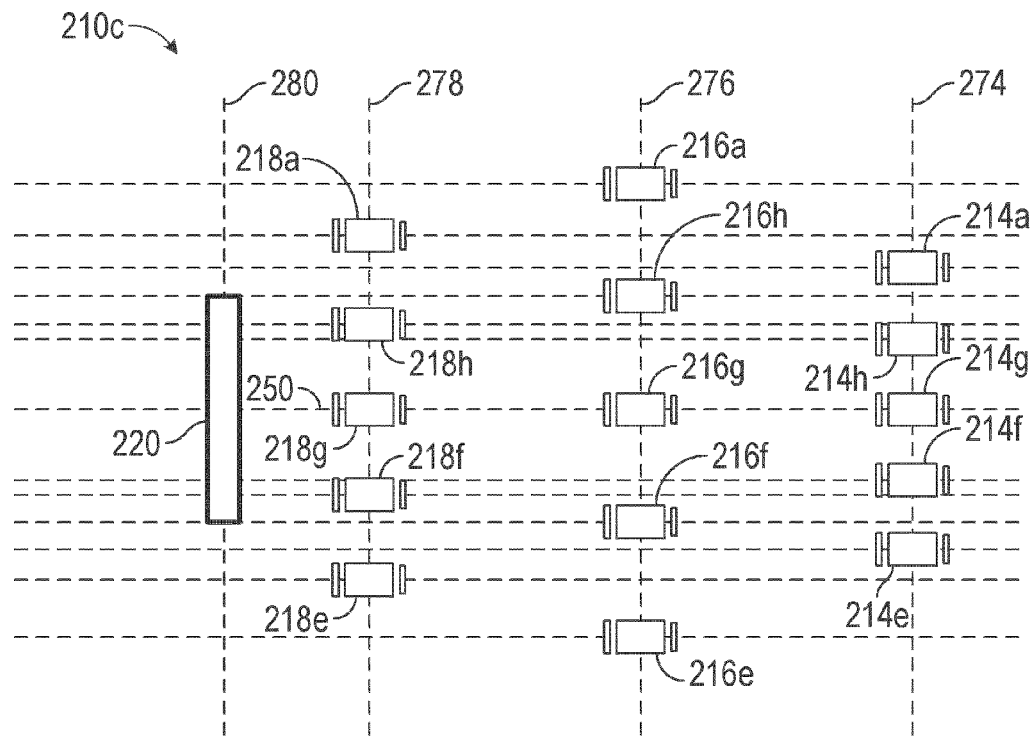
FIG. 2C illustrates a side view of an embodiment of a portion of a global camera configuration including a central camera, a first concentric ring of cameras, a second concentric ring of cameras, a third concentric ring of cameras and a back camera.

FIG. 2C illustrates a side view of an embodiment of a portion of a global camera configuration 210b including a central camera (not shown), a first concentric ring of cameras 214a-h (214b-d are not shown), a second concentric ring of cameras 216a-h (216b-d are not shown), a third concentric ring of cameras 218a-h (218b-d are not shown) and a back camera 220.

FIG. 2C is similar to FIG. 2B except that FIG. 2C shows back camera 220 in a different position relative to the concentric ring located along plane 278. The location of back camera 220 is used to illustrate that back camera 220 can be located in various positions relative to the other concentric rings along planes 274, 276, 278. However, in order to maintain a parallax free or substantially parallax free global camera system, the back camera 220 should have a virtual field of view from the same virtual entrance pupil location as the other cameras. This virtual field of view can be achieved by various implementations. For example, one implementation includes having the back camera 220 be an array of cameras having a virtual field of view from the same virtual entrance pupil location as the other cameras. This type of camera is described in further detail below with respect to FIG. 3.

Another example of a back camera 220 that may be implemented is rotating the back camera 220 of FIG. 2B around to face the opposite direction of the central camera. In this implementation, the back camera would not have a virtual field of view from the same virtual entrance pupil location as the other cameras. As such, this implementation would not be parallax free or substantially parallax free as in the above described embodiments.

In this embodiment, the locations of the cameras are for illustrative purposes to show the relative location of each camera. Each camera may be tilted to capture the fields of view according to the configurations discussed above with respect to FIGS. 1A-D.

In this illustration, the first concentric ring, the second concentric ring and the third concentric ring are shown as each having eight cameras (cameras b-d for each concentric ring are hidden behind cameras of the respective concentric ring). Additional or fewer cameras could be added. Additional or fewer concentric rings could be added.

Figure 3:
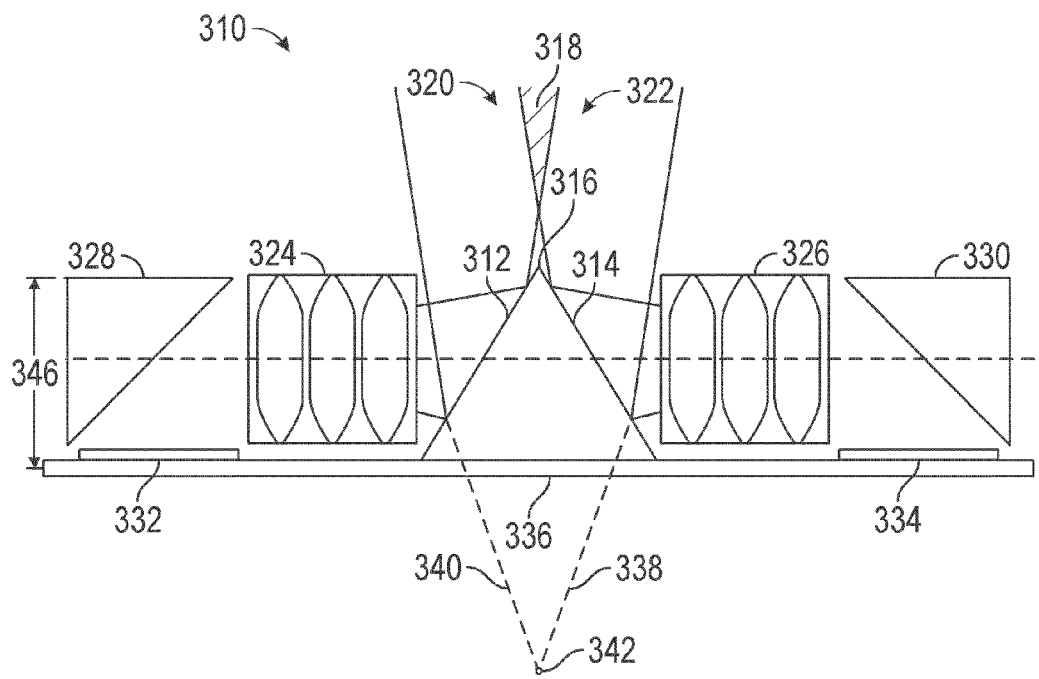
FIG. 3 illustrates a cross-sectional side view of an embodiment of a folded optic multi-sensor assembly.

FIG. 3 illustrates a cross-sectional side view of an embodiment of a folded optic multi-sensor assembly 310. Folded optic multi-sensor assembly 310 is suitable for use with, among other things, autofocus systems and techniques. The folded optic multi-sensor assembly 310 includes image sensors 332, 334, reflective secondary light folding surfaces 328, 330, lens assemblies 324, 326, and a central reflective element 316 which may all be mounted (or connected) to a substrate 336.

The image sensors 332, 334 may include, in certain embodiments, a charge-coupled device (CCD), complementary metal oxide semiconductor sensor (CMOS), or any other image sensing device that receives light and generates image data in response to the received image. Each sensor 332, 334 may include a plurality of sensors (or sensor elements) arranged in an array. Image sensors 332, 334 can generate image data for still photographs and can also generate image data for a captured video stream. Sensors 332 and 334 may be an individual sensor array, or each may represent arrays of sensors arrays, for example, a 3×1 array of sensor arrays. However, as will be understood by one skilled in the art, any suitable array of sensors may be used in the disclosed implementations.

The sensors 332, 334 may be mounted on the substrate 336 as shown in FIG. 3. In some embodiments, all sensors may be on one plane by being mounted to the flat substrate 336. Substrate 336 may be any suitable substantially flat material. The central reflective element 316 and lens assemblies 324, 326 may be mounted on substrate 336 as well. Multiple configurations are possible for mounting a sensor array or arrays, a plurality of lens assemblies, and a plurality of primary and secondary reflective or refractive surfaces.

In some embodiments, a central reflective element 316 may be used to redirect light from a target image scene toward the sensors 332, 334. Central reflective element 316 may be a reflective surface (e.g., a mirror) or a plurality of reflective surfaces (e.g., mirrors), and may be flat or shaped as needed to properly redirect incoming light to the image sensors 332, 334. For example, in some embodiments, central reflective element 316 may be a mirror sized and shaped to reflect incoming light rays through the lens assemblies 324, 326 to sensors 332, 334. The central reflective element 316 may split light comprising the target image into multiple portions and direct each portion at a different sensor. For example, a first reflective surface 312 of the central reflective element 316 (also referred to as a primary light folding surface, as other embodiments may implement a refractive prism rather than a reflective surface) may send a portion of the light corresponding to a first field of view 320 toward the first (left) sensor 332 while a second reflective surface 314 sends a second portion of the light corresponding to a second field of view 322 toward the second (right) sensor 334. It should be appreciated that together the fields of view 320, 322 of the image sensors 332, 334 cover at least the target image.

In some embodiments in which the receiving sensors are each an array of a plurality of sensors, the central reflective element may be made of multiple reflective surfaces angled relative to one another in order to send a different portion of the target image scene toward each of the sensors. Each sensor in the array may have a substantially different field of view, and in some embodiments the fields of view may overlap. Certain embodiments of the central reflective element may have complicated non-planar surfaces to increase the degrees of freedom when designing the lens system. Further, although the central element is discussed as being a reflective surface, in other embodiments central element may be refractive. For example, central element may be a prism configured with a plurality of facets, where each facet directs a portion of the light comprising the scene toward one of the sensors.

After being reflected off the central reflective element 316, at least a portion of incoming light may propagate through each of the lens assemblies 324, 326. One or more lens assemblies 324, 326 may be provided between the central reflective element 316 and the sensors 332, 334 and reflective surfaces 328, 330. The lens assemblies 324, 326 may be used to focus the portion of the target image which is directed toward each sensor 332, 334.

In some embodiments, each lens assembly may comprise one or more lenses and an actuator for moving the lens among a plurality of different lens positions. The actuator may be a voice coil motor (VCM), micro-electronic mechanical system (MEMS), or a shape memory alloy (SMA). The lens assembly may further comprise a lens driver for controlling the actuator.

In some embodiments, traditional auto focus techniques may be implemented by changing the focal length between the lens 324, 326 and corresponding sensors 332, 334 of each camera. In some embodiments, this may be accomplished by moving a lens barrel. Other embodiments may adjust the focus by moving the central light redirecting reflective mirror surface up or down or by adjusting the angle of the light redirecting reflective mirror surface relative to the lens assembly. Certain embodiments may adjust the focus by moving the side light redirecting reflective mirror surfaces over each sensor. Such embodiments may allow the assembly to adjust the focus of each sensor individually. Further, it is possible for some embodiments to change the focus of the entire assembly at once, for example by placing a lens like a liquid lens over the entire assembly. In certain implementations, computational photography may be used to change the focal point of the camera array.

Fields of view 320, 322 provide the folded optic multi-sensor assembly 310 with a virtual field of view perceived from a virtual region 342 where the virtual field of view is defined by virtual axes 338, 340. Virtual region 342 is the region at which sensors 332, 334 perceive and are sensitive to the incoming light of the target image. The virtual field of view should be contrasted with an actual field of view. An actual field of view is the angle at which a detector is sensitive to incoming light. An actual field of view is different from a virtual field of view in that the virtual field of view is a perceived angle from which incoming light never actually reaches. For example, in FIG. 3, the incoming light never reaches virtual region 342 because the incoming light is reflected off reflective surfaces 312, 314.

Multiple side reflective surfaces, for example, reflective surfaces 328 and 330, can be provided around the central reflective element 316 opposite the sensors. After passing through the lens assemblies, the side reflective surfaces 328, 330 (also referred to as a secondary light folding surface, as other embodiments may implement a refractive prism rather than a reflective surface) can reflect the light (downward, as depicted in the orientation of FIG. 3) onto the sensors 332, 334. As depicted, sensor 332 may be positioned beneath reflective surface 328 and sensor 334 may be positioned beneath reflective surface 330. However, in other embodiments, the sensors may be above the side reflected surfaces, and the side reflective surfaces may be configured to reflect light upward. Other suitable configurations of the side reflective surfaces and the sensors are possible in which the light from each lens assembly is redirected toward the sensors. Certain embodiments may enable movement of the side reflective surfaces 328, 330 to change the focus or field of view of the associated sensor.

Each sensor's field of view 320, 322 may be directed into the object space by the surface of the central reflective element 316 associated with that sensor. Mechanical methods may be employed to tilt the mirrors and/or move the prisms in the array so that the field of view of each camera can be directed to different locations on the object field. This may be used, for example, to implement a high dynamic range camera, to increase the resolution of the camera system, or to implement a plenoptic camera system. Each sensor's (or each 3×1 array's) field of view may be projected into the object space, and each sensor may capture a partial image comprising a portion of the target scene according to that sensor's field of view. As illustrated in FIG. 3, in some embodiments, the fields of view 320, 322 for the opposing sensor arrays 332, 334 may overlap by a certain amount 318. To reduce the overlap 318 and form a single image, a stitching process as described below may be used to combine the images from the two opposing sensor arrays 332, 334. Certain embodiments of the stitching process may employ the overlap 318 for identifying common features in stitching the partial images together. After stitching the overlapping images together, the stitched image may be cropped to a desired aspect ratio, for example 4:3 or 1:1, to form the final image. In some embodiments, the alignment of the optical elements relating to each FOV are arranged to minimize the overlap 318 so that the multiple images are formed into a single image with minimal or no image processing required in joining the images.

As illustrated in FIG. 3, the folded optic multi-sensor assembly 310 has a total height 346. In some embodiments, the total height 346 can be approximately 4.5 mm or less. In other embodiments, the total height 346 can be approximately 4.0 mm or less. Though not illustrated, the entire folded optic multi-sensor assembly 310 may be provided in a housing having a corresponding interior height of approximately 4.5 mm or less or approximately 4.0 mm or less.

As used herein, the term "camera" may refer to an image sensor, lens system, and a number of corresponding light folding surfaces; for example, the primary light folding surface 314, lens assembly 326, secondary light folding surface 330, and sensor 334 are illustrated in FIG. 3. A folded-optic multi-sensor assembly, referred to as an "array" or "array camera," can include a plurality of such cameras in various configurations. Some embodiments of array configurations are disclosed in U.S. Application Pub. No. 2014/0111650, filed Mar. 15, 2013 and titled "MULTI-CAMERA SYSTEM USING FOLDED OPTICS," the disclosure of which is hereby incorporated by reference. Other array camera configurations that would benefit from the autofocus systems and techniques described herein are possible.

Figure 4:
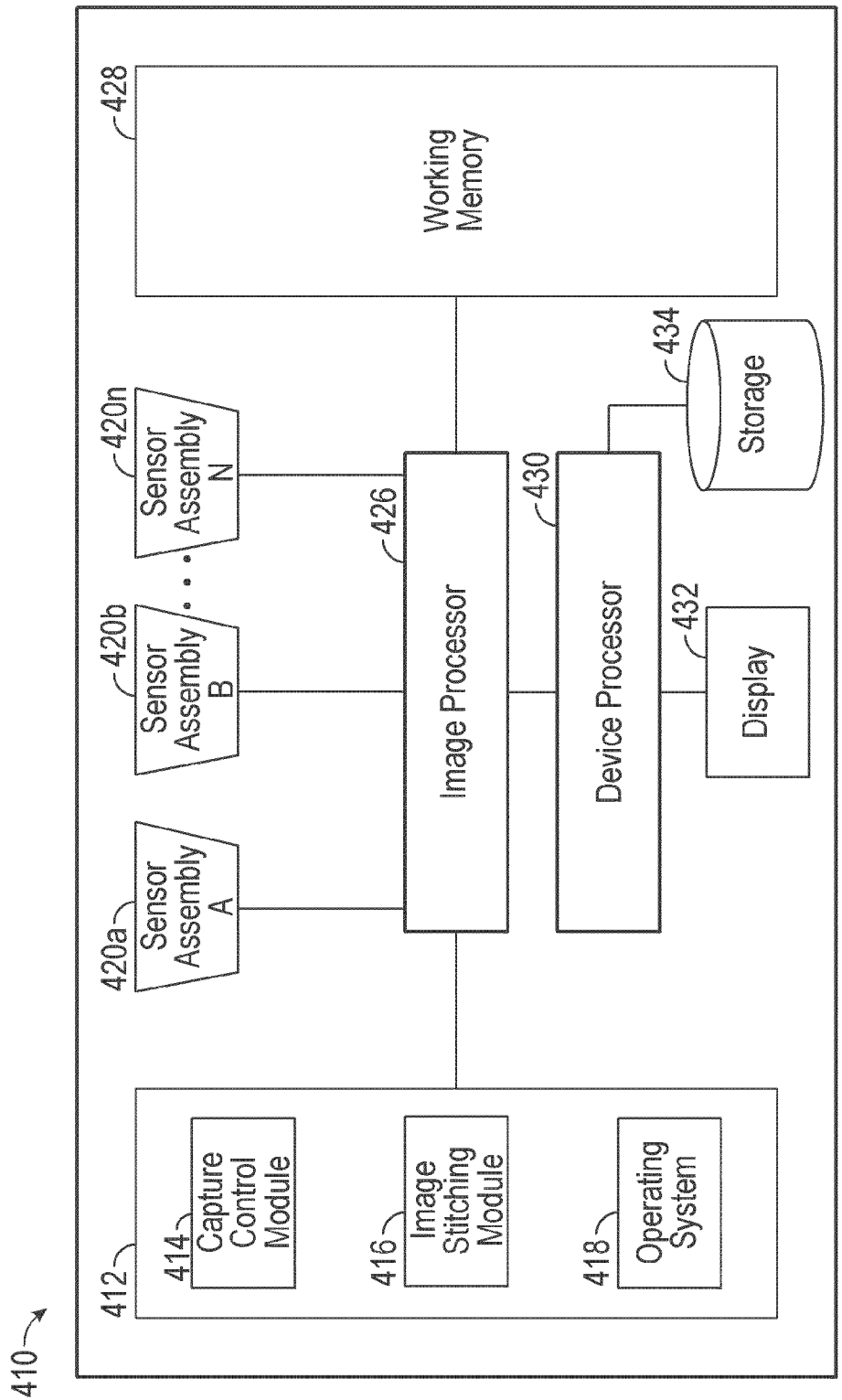
FIG. 4 illustrates a block diagram of an embodiment of an imaging device.

FIG. 4 depicts a high-level block diagram of a device 410 having a set of components including an image processor 426 linked to one or more cameras 420a -n. The image processor 426 is also in communication with a working memory 428, memory component 412, and device processor 430, which in turn is in communication with storage 434 and electronic display 432.

Device 410 may be a cell phone, digital camera, tablet computer, personal digital assistant, or the like. There are many portable computing devices in which a reduced thickness imaging system such as is described herein would provide advantages. Device 410 may also be a stationary computing device or any device in which a thin imaging system would be advantageous. A plurality of applications may be available to the user on device 410. These applications may include traditional photographic and video applications, high dynamic range imaging, panoramic photo and video, or stereoscopic imaging such as 3D images or 3D video.

The image capture device 410 includes cameras 420a -n for capturing external images. Each of cameras 420a -n may comprise a sensor, lens assembly, and a primary and secondary reflective or refractive mirror surface for reflecting a portion of a target image to each sensor, as discussed above with respect to FIG. 3. In general, N cameras 420*a -n* may be used, where N≥2. Thus, the target image may be split into N portions in which each sensor of the N cameras captures one portion of the target image according to that sensor's field of view. It will be understood that cameras 420*a -n* may comprise any number of cameras suitable for an implementation of the folded optic imaging device described herein. The number of sensors may be increased to achieve lower z-heights of the system or to meet the needs of other purposes, such as having overlapping fields of view similar to that of a plenoptic camera, which may enable the ability to adjust the focus of the image after post-processing. Other embodiments may have a field of view overlap configuration suitable for high dynamic range cameras enabling the ability to capture two simultaneous images and then merge them together. Cameras 420*a -n* may be coupled to the image processor 426 to communicate captured images to the working memory 428, the device processor 430, to the electronic display 432 and to the storage (memory) 434.

The image processor 426 may be configured to perform various processing operations on received image data comprising N portions of the target image in order to output a high quality stitched image, as will be described in more detail below. Image processor 426 may be a general purpose processing unit or a processor specially designed for imaging applications. Examples of image processing operations include cropping, scaling (e.g., to a different resolution), image stitching, image format conversion, color interpolation, color processing, image filtering (for example, spatial image filtering), lens artifact or defect correction, etc. Image processor 426 may, in some embodiments, comprise a plurality of processors. Certain embodiments may have a processor dedicated to each image sensor. Image processor 426 may be one or more dedicated image signal processors (ISPs) or a software implementation of a processor.

As shown, the image processor 426 is connected to a memory 412 and a working memory 428. In the illustrated embodiment, the memory 412 stores capture control module 414, image stitching module 416, operating system 418, and reflector control module 419. These modules include instructions that configure the image processor 426 of device processor 430 to perform various image processing and device management tasks. Working memory 428 may be used by image processor 426 to store a working set of processor instructions contained in the modules of memory component 412. Alternatively, working memory 428 may also be used by image processor 426 to store dynamic data created during the operation of device 410.

As mentioned above, the image processor 426 is configured by several modules stored in the memories. The capture control module 414 may include instructions that configure the image processor 426 to call reflector control module 419 to position the extendible reflectors of the camera in a first or second position, and may include instructions that configure the image processor 426 to adjust the focus position of cameras 420*a -n*. Capture control module 414 may further include instructions that control the overall image capture functions of the device 410. For example, capture control module 414 may include instructions that call subroutines to configure the image processor 426 to capture raw image data of a target image scene using the cameras 420*a -n*. Capture control module 414 may then call the image stitching module 416 to perform a stitching technique on the N partial images captured by the cameras 420*a -n* and output a stitched and cropped target image to imaging processor 426. Capture control module 414 may also call the image stitching module 416 to perform a stitching operation on raw image data in order to output a preview image of a scene to be captured, and to update the preview image at certain time intervals or when the scene in the raw image data changes.

Image stitching module 416 may comprise instructions that configure the image processor 426 to perform stitching and cropping techniques on captured image data. For example, each of the N sensors 420*a -n* may capture a partial image comprising a portion of the target image according to each sensor's field of view. The fields of view may share areas of overlap, as described above and below. In order to output a single target image, image stitching module 416 may configure the image processor 426 to combine the multiple N partial images to produce a high-resolution target image. Target image generation may occur through known image stitching techniques. Examples of image stitching can be found in U.S. patent application Ser. No. 11/623,050 which is hereby incorporated by reference.

For example, image stitching module 416 may include instructions to compare the areas of overlap along the edges of the N partial images for matching features in order to determine rotation and alignment of the N partial images relative to one another. Due to rotation of partial images and/or the shape of the field of view of each sensor, the combined image may form an irregular shape. Therefore, after aligning and combining the N partial images, the image stitching module 416 may call subroutines which configure image processor 426 to crop the combined image to a desired shape and aspect ratio, for example a 4:3 rectangle or 1:1 square. The cropped image may be sent to the device processor 430 for display on the display 432 or for saving in the storage 434.

Operating system module 418 configures the image processor 426 to manage the working memory 428 and the processing resources of device 410. For example, operating system module 418 may include device drivers to manage hardware resources such as the cameras 420*a -n*. Therefore, in some embodiments, instructions contained in the image processing modules discussed above may not interact with these hardware resources directly, but instead interact through standard subroutines or APIs located in operating system component 418. Instructions within operating system 418 may then interact directly with these hardware components. Operating system module 418 may further configure the image processor 426 to share information with device processor 430.

The image processor 426 can provide image capture mode selection controls to a user, for instance by using a touch-sensitive display 432, allowing the user of device 410 to select an image capture mode corresponding to either the standard FOV image or a wide FOV image.

Device processor 430 may be configured to control the display 432 to display the captured image, or a preview of the captured image, to a user. The display 432 may be external to the imaging device 410 or may be part of the imaging device 410. The display 432 may also be configured to provide a view finder displaying a preview image for a use prior to capturing an image, or may be configured to display a captured image stored in memory or recently captured by the user. The display 432 may comprise an LCD or LED screen, and may implement touch sensitive technologies.

Device processor 430 may write data to storage module 434, for example data representing captured images. While storage module 434 is represented graphically as a traditional disk device, those with skill in the art would understand that the storage module 434 may be configured as any storage media device. For example, the storage module 434 may include a disk drive, such as a floppy disk drive, hard disk drive, optical disk drive or magneto-optical disk drive, or a solid state memory such as a FLASH memory, RAM, ROM, and/or EEPROM. The storage module 434 can also include multiple memory units, and any one of the memory units may be configured to be within the image capture device 410, or may be external to the image capture device 410. For example, the storage module 434 may include a ROM memory containing system program instructions stored within the image capture device 410. The storage module 434 may also include memory cards or high speed memories configured to store captured images which may be removable from the camera.

Although FIG. 4 depicts a device having separate components to include a processor, imaging sensor, and memory, one skilled in the art would recognize that these separate components may be combined in a variety of ways to achieve particular design objectives. For example, in an alternative embodiment, the memory components may be combined with processor components to save cost and improve performance. Additionally, although FIG. 4 illustrates two memory components, including memory component 412 comprising several modules and a separate memory 428 comprising a working memory, one with skill in the art would recognize several embodiments utilizing different memory architectures. For example, a design may utilize ROM or static RAM memory for the storage of processor instructions implementing the modules contained in memory component 412. The processor instructions may be loaded into RAM to facilitate execution by the image processor 426. For example, working memory 428 may comprise RAM memory, with instructions loaded into working memory 428 before execution by the processor 426.

Figure 5:
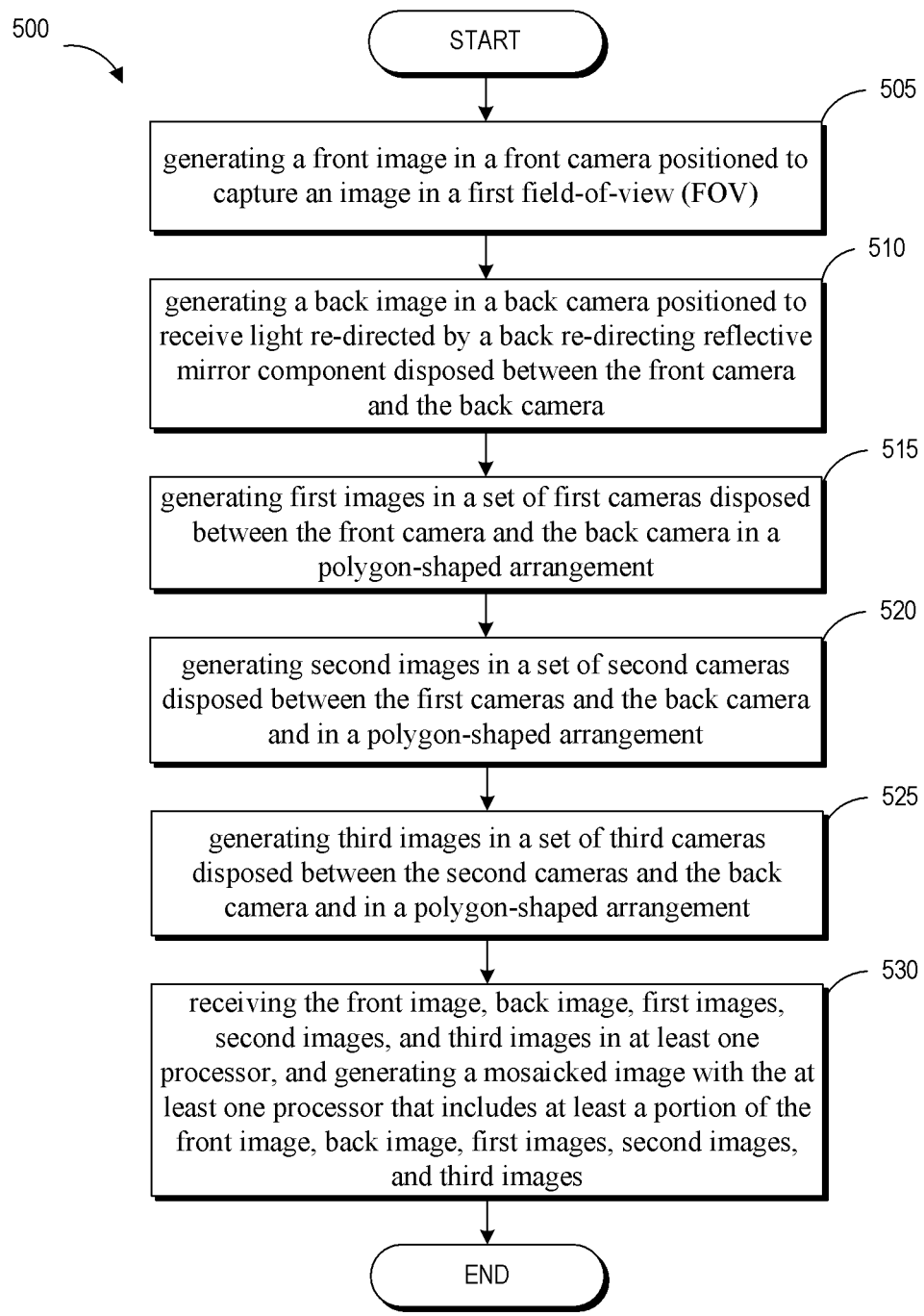
FIG. 5 illustrates blocks of one example of a method of capturing a target image.

FIG. 5 illustrates blocks of one example of a method 500 of capturing a target image. The method 500 of generating an image depicting a spherical field-of-view (FOV) includes several blocks.

At block 505, a front image is generated in a front camera positioned to capture an image in a first FOV around a projected optical axis of the front camera. The projected optical axis of the front camera is in a first direction.

At block 510, a back image is generated in a back camera positioned to receive light re-directed by a back re-directing reflective mirror component disposed between the front camera and the back camera. The back camera is positioned to capture an image in a second FOV.

At block 515, first images are generated in a set of first cameras disposed between the front camera and the back camera in a polygon-shaped arrangement. The first cameras are collectively configured to capture images in a third FOV. The third FOV is circular-shaped and projecting outward away from the first cameras. At least a portion of the third FOV is between the first FOV and the second FOV.

At block 520, second images are generated in a set of second cameras disposed between the first cameras and the back camera and in a polygon-shaped arrangement. The second cameras are collectively configured to capture images in a fourth FOV. The fourth FOV is circular-shaped and projecting outward away from the second cameras. At least a portion of the fourth FOV is between the third FOV and the second FOV.

At block 525, third images are generated in a set of third cameras disposed between the second cameras and the back camera and in a polygon-shaped arrangement, and collectively configured to capture images in a fifth FOV. The fifth FOV is circular-shaped projecting outward away from the third cameras. At least a portion of the fifth FOV is between the fourth FOV and the second FOV.

At block 530, the front image, back image, first images, second images, and third images are received in at least one processor. A mosaicked image is generated with the at least one processor that includes at least a portion of the front image, back image, first images, second images, and third images. The mosaicked image is generated to depict a spherical image as seen from a perspective viewpoint within the spherical image. Generating the mosaicked image includes stitching together at least a portion of the front image, back image, first images, second images, and third images.

The first, second, third, fourth, and fifth FOV at least partially overlap. The set of first cameras, the set of second cameras, and the set of third cameras are arranged to form three concentric rings. The back camera is a folded optic multi-sensor assembly.

Implementations disclosed herein provide systems, methods and apparatus for multiple aperture array cameras free from parallax and tilt artifacts. One skilled in the art will recognize that these embodiments may be implemented in hardware, software, firmware, or any combination thereof.

In some embodiments, the circuits, processes, and systems discussed above may be utilized in a wireless communication device. The wireless communication device may be a kind of electronic device used to wirelessly communicate with other electronic devices. Examples of wireless communication devices include cellular telephones, smart phones, Personal Digital Assistants (PDAs), e-readers, gaming systems, music players, netbooks, wireless modems, laptop computers, tablet devices, etc.

The wireless communication device may include one or more image sensors, two or more image signal processors, a memory including instructions or modules for carrying out the CNR process discussed above. The device may also have data, a processor loading instructions and/or data from memory, one or more communication interfaces, one or more input devices, one or more output devices such as a display device and a power source/interface. The wireless communication device may additionally include a transmitter and a receiver. The transmitter and receiver may be jointly referred to as a transceiver. The transceiver may be coupled to one or more antennas for transmitting and/or receiving wireless signals.

The wireless communication device may wirelessly connect to another electronic device (e.g., base station). A wireless communication device may alternatively be referred to as a mobile device, a mobile station, a subscriber station, a user equipment (UE), a remote station, an access terminal, a mobile terminal, a terminal, a user terminal, a subscriber unit, etc. Examples of wireless communication devices include laptop or desktop computers, cellular phones, smart phones, wireless modems, e-readers, tablet devices, gaming systems, etc. Wireless communication devices may operate in accordance with one or more industry standards such as the 3rd Generation Partnership Project (3GPP). Thus, the general term "wireless communication device" may include wireless communication devices described with varying nomenclatures according to industry standards (e.g., access terminal, user equipment (UE), remote terminal, etc.).

The functions described herein may be stored as one or more instructions on a processor-readable or computer-readable medium. The term "computer-readable medium" refers to any available medium that can be accessed by a computer or processor. By way of example, and not limitation, such a medium may comprise RAM, ROM, EEPROM, flash memory, CD-ROM or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code or data that is/are executable by a computing device or processor.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It should be noted that the terms "couple," "coupling," "coupled" or other variations of the word couple as used herein may indicate either an indirect connection or a direct connection. For example, if a first component is "coupled" to a second component, the first component may be either indirectly connected to the second component or directly connected to the second component. As used herein, the term "plurality" denotes two or more. For example, a plurality of components indicates two or more components.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

In the foregoing description, specific details are given to provide a thorough understanding of the examples. However, it will be understood by one of ordinary skill in the art that the examples may be practiced without these specific details. For example, electrical components/devices may be shown in block diagrams in order not to obscure the examples in unnecessary detail. In other instances, such components, other structures and techniques may be shown in detail to further explain the examples.

Headings are included herein for reference and to aid in locating various sections. These headings are not intended to limit the scope of the concepts described with respect thereto. Such concepts may have applicability throughout the entire specification.

It is also noted that the examples may be described as a process, which is depicted as a flowchart, a flow diagram, a finite state diagram, a structure diagram, or a block diagram. Although a flowchart may describe the operations as a sequential process, many of the operations can be performed in parallel, or concurrently, and the process can be repeated. In addition, the order of the operations may be re-arranged.

A process is terminated when its operations are completed. A process may correspond to a method, a function, a procedure, a subroutine, a subprogram, etc. When a process corresponds to a software function, its termination corresponds to a return of the function to the calling function or the main function.

The previous description of the disclosed implementations is provided to enable any person skilled in the art to make or use the present invention. Various modifications to these implementations will be readily apparent to those skilled in the art, and the generic principles defined herein may be applied to other implementations without departing from the spirit or scope of the invention. Thus, the present invention is not intended to be limited to the implementations shown herein but is to be accorded the widest scope consistent with the principles and novel features disclosed herein.

What is claimed is:

1. An imaging system for capturing a plurality of images which together depict spherical image, comprising:
    a front camera positioned to capture an image in a first field-of-view (FOV) around a projected optical axis of the front camera, the projected optical axis of the front camera being in a first direction;
    a back camera positioned to receive light re-directed by a back re-directing reflective mirror component disposed between the front camera and the back camera, the back camera positioned to capture an image in a second FOV around a projected optical axis of the back camera, the projected optical axis of the back camera being in the first direction;
    a set of first cameras disposed between the front camera and the back camera in a polygon-shaped arrangement, the first cameras collectively configured to capture images in a third FOV, the third FOV circular-shaped around the projected optical axis of the front camera and projecting outward away from the projected optical axis of the front camera, and at least a portion of the third FOV being between the first FOV and the second FOV;
    a set of second cameras disposed between the set of first cameras and the back camera and in a polygon-shaped arrangement, the set of second cameras collectively configured to capture images in a fourth FOV, the fourth FOV circular-shaped around the projected optical axis of the front camera and projecting outward away from the projected optical axis of the front camera, and at least a portion of the fourth FOV being between the third FOV and the second FOV; and
    a set of third cameras disposed between the set of second cameras and the back camera and in a polygon-shaped arrangement, and collectively configured to capture images in a fifth FOV, the fifth FOV circular-shaped around the projected optical axis of the front camera and projecting outward away from the projected optical axis of the front camera, and at least a portion of the fifth FOV being between the fourth FOV and the second FOV,
    the front camera, back camera, the set of first cameras, the set of second cameras and the set of third cameras configured such that images captured in the first, second, third, fourth and fifth FOV collectively represent a spherical image as seen from a perspective of the imaging system.

2. The imaging system of claim 1, further comprising:
a memory component;
a processor coupled to the memory component and to each of the cameras, the processor and the memory component collectively configured to save an image from each one of the cameras, and further configured to generate the spherical image that includes at least a portion of the images from each of the cameras.

3. The imaging system of claim 1, wherein the back re-directing reflective mirror component is a reflector disposed perpendicular to the projected optical axis of the front camera.

4. The imaging system of claim 1, further comprising a plurality of light re-directing reflective mirror components, each camera in the set of first cameras, the set of second cameras and the set of third cameras positioned to receive light re-directed reflected from one of the plurality of light redirecting reflective mirror components.

5. The imaging system of claim 4, wherein the plurality of light re-directing reflective mirror components comprises a plurality of reflectors.

6. The imaging system of claim 5, wherein the plurality of light re-directing reflective mirror components include a first set of light re-directing reflective mirror components arranged around a longitudinal axis of the imaging system that includes the first optical axis and arranged in a first plane, a second set of light re-directing reflective mirror components arranged around the longitudinal axis of the imaging system that includes the first optical axis and arranged in a second plane, and a third set of light re-directing reflective mirror components arranged around a longitudinal axis of the imaging system that includes the first optical axis and arranged in a third plane, the first second and third planes being disposed between the front camera and the back camera.

7. The imaging system of claim 1, wherein the set of first cameras are disposed at an offset from the set of second cameras and the set of third cameras, the set of second cameras are disposed at an offset from the set of first cameras and the set of third cameras, and the set of third cameras are disposed at an offset from the set of first cameras and the set of second cameras.

8. The imaging system of claim 1, wherein the set of first cameras are disposed in a first plane, the set of second cameras are disposed in a second plane, and the set of third cameras are disposed in a third plane.

9. The imaging system of claim 8, wherein the first, second and third planes are parallel.

10. The imaging system of claim 1, wherein the set of first cameras comprises eight cameras, the set of second cameras comprise eight cameras, and the set of third cameras comprises eight cameras.

11. The imaging system of claim 1, wherein the set of first cameras are disposed equally spaced apart, the set of second cameras are disposed equally spaced apart, and the set of third cameras are disposed equally spaced apart.

12. An imaging system, comprising:
a front camera having a first field-of-view (FOV) in a first direction and an optical axis that extends through the first FOV in a first direction;
a back camera having an optical axis, the back camera positioned such that the optical axis of the back camera is aligned in the first direction to extend through the first FOV and positioned along a line congruent with the optical axis of the front camera;
a plurality of side cameras disposed between the front camera and the back camera, the plurality of side cameras having a combined FOV that extends around the optical axis of the front camera and away from the optical axis of the front camera;
a back light re-directing reflective mirror component disposed between the back camera and plurality of side cameras, the back camera and the back light re-directing reflective mirror component positioned such that the optical axis of the back camera is pointed at the back light re-directing reflective mirror component such that the back camera receives light re-directed reflected by the back light re-directing reflective mirror component along the optical axis of the back camera; and
a plurality of side light re-directing reflective mirror components, each of the plurality of side cameras positioned to receive light re-directed from one of the plurality of light re-directing reflective mirror components.

13. The imaging system of claim 12, wherein the plurality of side cameras are offset from the optical axis of the front camera.

14. The imaging system of claim 12, wherein the plurality of side cameras are arranged to form three concentric rings.

15. The imaging system of claim 12, wherein the plurality of side cameras comprise a first set of array cameras, a second set of array cameras, and a third set of array cameras, each of the first, second and third set of array cameras collectively having a FOV that includes at least a portion of a target scene.

16. The imaging system of claim 15, wherein each array camera includes an image sensor, and wherein the image sensors of the first set of array cameras are disposed on a first substrate, the image sensors of the second set of array cameras are disposed on a second substrate, and the third set of array cameras are disposed on a third substrate.

17. The imaging system of claim 16, wherein the first, second and third substrates are disposed in planes that are parallel.

18. A method of generating an image depicting a spherical field-of-view (FOV), the method comprising:
generating a front image in a front camera positioned to capture an image in a first field-of-view (FOV) around a projected optical axis of the front camera, the projected optical axis of the front camera being in a first direction;
generating a back image in a back camera positioned to receive light re-directed by a back re-directing reflective mirror component disposed between the front camera and the back camera, the back camera positioned to capture an image in a second FOV;
generating first images in a set of first cameras disposed between the front camera and the back camera in a polygon-shaped arrangement, the set of first cameras collectively configured to capture images in a third FOV, the third FOV circular-shaped around the projected optical axis of the front camera and projecting outward away from the projected optical axis of the front camera and at least a portion of the third FOV being between the first FOV and the second FOV;
generating second images in a set of second cameras disposed between the set of first cameras and the back camera and in a polygon-shaped arrangement, the set of second cameras collectively configured to capture images in a fourth FOV, the fourth FOV circular-shaped around the projected optical axis of the front camera and projecting outward away from the projected optical axis of the front camera and at least a portion of the fourth FOV being between the third FOV and the second FOV;

generating third images in a set of third cameras disposed between the set of second cameras and the back camera and in a polygon-shaped arrangement, and collectively configured to capture images in a fifth FOV, the fifth FOV circular-shaped around the projected optical axis of the front camera projecting outward away from the projected optical axis of the front camera and at least a portion of the fifth FOV being between the fourth FOV and the second FOV; and receiving the front image, back image, first images, second images, and third images in at least one processor, and generating a mosaicked image with the at least one processor that includes at least a portion of the front image, back image, first images, second images, and third images.

19. The method of claim 18, wherein the mosaicked image is generated to depict a spherical image as seen from a perspective viewpoint within the spherical image.

20. The method of claim 18, wherein generating the mosaicked image comprises stitching together at least a portion of the front image, back image, first images, second images, and third images.

21. The method of claim 18, wherein the first, second, third, fourth, and fifth FOV at least partially overlap.

22. The method of claim 18, wherein the set of first cameras, the set of second cameras, and the set of third cameras are arranged to form three concentric rings.

23. The method of claim 18, wherein the back camera is a folded optic multi-sensor assembly.

24. An imaging device, comprising:

means for generating a front image in a front camera positioned to capture an image in a first field-of-view (FOV) around a projected optical axis of the front camera, the projected optical axis of the front camera being in a first direction;

means for generating a back image in a back camera positioned to receive light re-directed reflected by a back re-directing reflective mirror component disposed between the front camera and the back camera, the back camera positioned to capture an image in a second FOV;

means for generating first images in a set of first cameras disposed between the front camera and the back camera in a polygon-shaped arrangement, the set of first cameras collectively configured to capture images in a third FOV, the third FOV circular-shaped around the projected optical axis of the front camera and projecting outward away from the projected optical axis of the front camera first cameras and at least a portion of the third FOV being between the first FOV and the second FOV;

means for generating second images in a set of second cameras disposed between the first cameras and the back camera and in a polygon-shaped arrangement, the set of second cameras collectively configured to capture images in a fourth FOV, the fourth FOV circular-shaped around the projected optical axis of the front camera and projecting outward away from the projected optical axis of the front camera and at least a portion of the fourth FOV being between the third FOV and the second FOV;

means for generating third images in a set of third cameras disposed between the set of second cameras and the back camera and in a polygon-shaped arrangement, and collectively configured to capture images in a fifth FOV, the fifth FOV circular-shaped around the projected optical axis of the front camera projecting outward away from the projected optical axis of the front camera and at least a portion of the fifth FOV being between the fourth FOV and the second FOV; and means for receiving the front image, back image, first images, second images, and third images and generating a mosaicked image that includes at least a portion of the front image, back image, first images, second images, and third images.

25. The imaging device of claim 24, wherein the mosaicked image is generated to depict a spherical image as seen from a perspective viewpoint within the spherical image.

26. The method of claim 24, wherein generating the mosaicked image comprises stitching together at least a portion of the front image, back image, first images, second images, and third images.

27. The method of claim 24, wherein the first, second, third, fourth, and fifth FOV at least partially overlap.

28. The method of claim 24, wherein the set of first cameras, the set of second cameras, and the set of third cameras are arranged to form three concentric rings.

29. The method of claim 24, wherein the back camera is a folded optic multi-sensor assembly.

* * * * *